US012786659B2

(12) United States Patent
Okimoto et al.

(10) Patent No.: US 12,786,659 B2
(45) Date of Patent: Nov. 3, 2026

(54) INFORMATION PROCESSING APPARATUS AND INFORMATION PROCESSING METHOD

(71) Applicant: SONY GROUP CORPORATION, Tokyo (JP)

(72) Inventors: Koyuru Okimoto, Tokyo (JP); Toru Nakagawa, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 93 days.

(21) Appl. No.: 18/838,899

(22) PCT Filed: Feb. 22, 2023

(86) PCT No.: PCT/JP2023/006370
§ 371 (c)(1),
(2) Date: Aug. 15, 2024

(87) PCT Pub. No.: WO2023/171375
PCT Pub. Date: Sep. 14, 2023

(65) Prior Publication Data

US 2025/0159426 A1 May 15, 2025

(30) Foreign Application Priority Data

Mar. 10, 2022 (JP) ................................ 2022-037170

(51) Int. Cl.
*H04S 7/00* (2006.01)

(52) U.S. Cl.
CPC .................................... *H04S 7/306* (2013.01)

(58) Field of Classification Search
CPC ....... H04S 7/305; H04S 7/306; H04S 2420/01
See application file for complete search history.

(56) References Cited

U.S. PATENT DOCUMENTS

| | | | | |
|---|---|---|---|---|
| 2020/0388291 | A1 | 12/2020 | Lee et al. | |
| 2021/0398545 | A1* | 12/2021 | Johnson | H04S 7/306 |
| 2023/0007430 | A1* | 1/2023 | Tsuchida | H04S 7/307 |
| 2023/0179946 | A1* | 6/2023 | Okimoto | G10K 15/12 381/63 |

FOREIGN PATENT DOCUMENTS

| | | | |
|---|---|---|---|
| JP | 2021-184509 | A | 12/2021 |
| WO | 2021/187229 | A1 | 9/2021 |

OTHER PUBLICATIONS

International Search Report and Written Opinion of PCT Application No. PCT/JP2023/006370, issued on Apr. 18, 2023, 09 pages of ISRWO.

* cited by examiner

*Primary Examiner* — David L Ton
(74) *Attorney, Agent, or Firm* — CHIP LAW GROUP

(57) ABSTRACT

The present technique pertains to an information processing apparatus and an information processing method that enable a BRIR to be accurately reproduced. The information processing apparatus according to the present technique includes a generation unit that generates a BRIR for a first measurement position on the basis of an RIR, the RIR being obtained on the basis of a sound outputted from a first sound source disposed in a first measurement environment, and an HRIR that corresponds to a positional relation between the first sound source and a first measurement position for the RIR within the first measurement environment. The present technique can be applied to an acoustic processing system used in the production of audio for a movie, for example.

13 Claims, 25 Drawing Sheets

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2023/006370 filed on Feb. 22, 2023, which claims priority benefit of Japanese Patent Application No. JP 2022-037170 filed in the Japan Patent Office on Mar. 10, 2022. Each of the above-referenced applications is hereby incorporated herein by reference in its entirety.

TECHNICAL FIELD

The present technique pertains to an information processing apparatus and an information processing method, and particularly pertains to an information processing apparatus and an information processing method that enable a BRIR to be accurately reproduced.

BACKGROUND ART

It is possible to use a binaural room transfer function (BRIR: Binaural Room Impulse Response), which mathematically indicates how a sound reaches ears from a sound source in a certain space, to three-dimensionally reproduce a sound image by headphones.

For example, there is a case in which a BRIR is used to reproduce the acoustics of a studio for producing movie audio and the acoustics are used in the production of the movie audio. In this case, the BRIR used in order to reproduce the acoustics of the studio is measured by outputting audio corresponding to a measurement signal from each speaker in the studio, and collecting this audio by microphones worn on user's ears.

Typically, multiple studios are used separately according to production title or work content. Accordingly, BRIRs corresponding to respective studios become necessary in order to reproduce the acoustics of the respective studios. In order to measure BRIRs corresponding to respective studios, it is not efficient for a user to visit and make a precise measurement of all of the studios.

In contrast to this, PTL 1 describes a technique in which parameters for a direct sound, an initial reflected sound, and late reverberation which are obtained from a BRIR that is able to reproduce a space that will serve as a reference are each independently controlled and a BRIR for a space of interest is generated.

CITATION LIST

Patent Literature

[PTL 1]
PCT Patent Publication No. WO2021/187229

SUMMARY

Technical Problem

However, it has been difficult to use the technique described in PTL1 to accurately reproduce a BRIR measured in an actual space.

The present technique is made in the light of such a situation, and enables a BRIR to be accurately reproduced.

Solution to Problem

An information processing apparatus according to one aspect of the present technique is provided with a generation unit that generates a BRIR for a first measurement position on the basis of an RIR, the RIR being obtained on the basis of a sound outputted from a first sound source disposed in a first measurement environment, and an HRIR that corresponds to a positional relation between the first sound source and a first measurement position for the RIR within the first measurement environment.

In an information processing method according to one aspect of the present technique, an information processing apparatus generates a BRIR for a first measurement position on the basis of an RIR, the RIR being obtained on the basis of a sound outputted from a first sound source disposed in a first measurement environment, and an HRIR that corresponds to a positional relation between the first sound source and a first measurement position for the RIR within the first measurement environment.

In one aspect of the present technique, a BRIR for a first measurement position is generated on the basis of an RIR, the RIR being obtained on the basis of a sound outputted from a first sound source disposed in a first measurement environment, and an HRIR that corresponds to a positional relation between the first sound source and the first measurement position for the RIR within the first measurement environment.

DESCRIPTION OF EMBODIMENT

Description is given below regarding aspects for implementing the present technique. The description is given in the following order.

1. Configuration of acoustic processing system
2. Configuration and operation of each apparatus
3. Variations

1. Configuration of Acoustic Processing System

Outline

It is possible to use a binaural indoor transfer function (BRIR: Binaural Room Impulse Response), which indicates a transfer characteristic of audio from a sound source to both ears in a certain indoor sound field, to three-dimensionally reproduce a sound image by headphones. The BRIR is an indoor impulse response that is measured by a dummy head (HATS: Head and Torso Simulators) or microphones worn on user's ears, and is divided into a head-related impulse response (HRIR) and a room impulse response (RIR).

Figure 1:
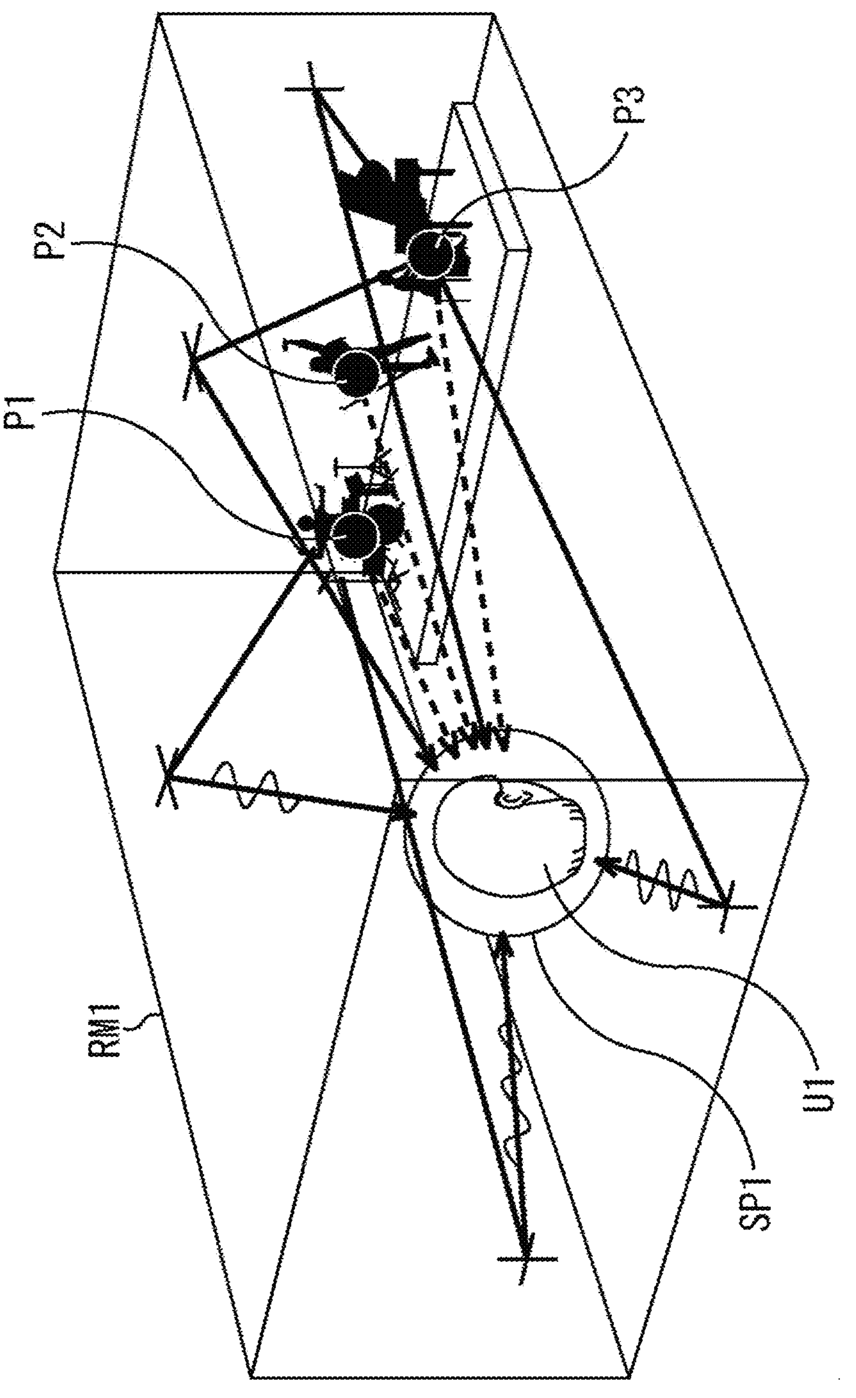
FIG. 1 is a view for describing an RIR and an HRIR.

FIG. 1 is a view for describing an RIR and an HRIR.

In a space RM1, audio emitted from sound sources P1 through P3 reaches a user U1 as a direct sound, an initial reflected sound, and late reverberation, for example.

Among audio emitted from the sound sources P1 through P3, a direct sound, which is indicated by broken-line arrows in FIG. 1, is audio that reaches the user U1 without reflecting in the space RM1. Among audio emitted from the sound sources P1 through P3, an initial reflected sound and late reverberation, which are indicated by solid-line arrows, are audio that reaches the user U1 after being reflected in the space RM1.

The transfer characteristics of a direct sound, an initial reflected sound, and late reverberation are described by an RIR. The RIR indicates impact of the space RM1 in a BRIR, and represents, in the time domain, an indoor transfer function (RTF: Room Transfer Function), which is frequency domain information indicating a transfer characteristic of audio from the sound sources P1 through P3 to both ears of the user U1.

An HRIR indicates impact of the user U1 in the BRIR, and represents, in the time domain, a head-related transfer function (HRTF: Head Related Transfer function) that is frequency domain information indicating a transfer characteristic of audio which has reached a spherical surface SP1 centered on the user U1 and reaches both ears of the user U1.

Figure 2:
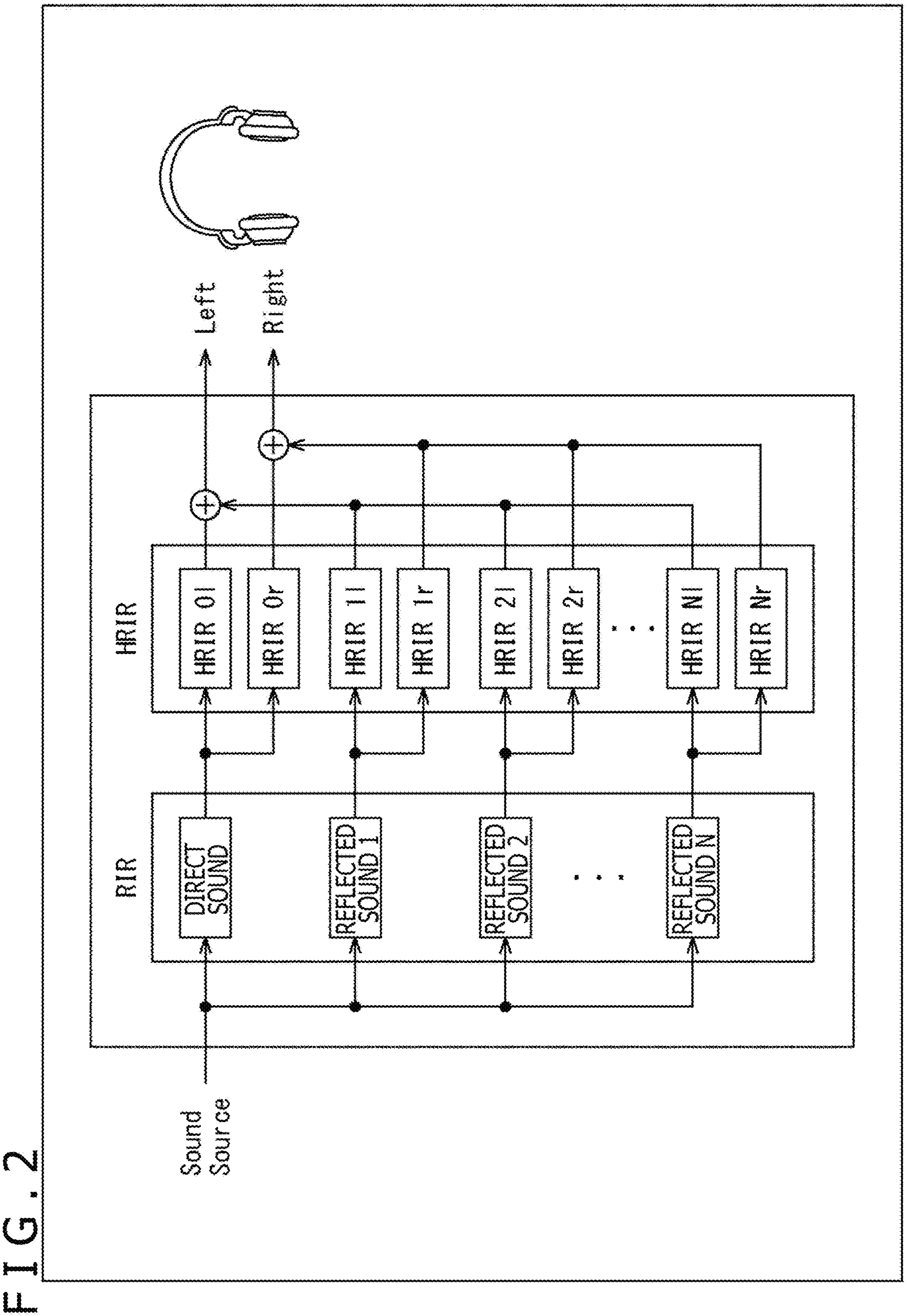
FIG. 2 is a view that illustrates signal processing that uses RIRs and HRIRs.

In a case of using a BRIR to reproduce the acoustics of the space RM1, as illustrated in FIG. 2, RIRs for a direct sound and reflected sounds 1 through N are respectively convolved with acoustic signals corresponding to the audio emitted from the sound sources P1 through P3.

An HRIR 0l and an HRIR 0r with respect to virtual sound sources corresponding to a direction of arrival of the direct sound are respectively convolved with the acoustic signal resulting from the RIR being convolved with the direct sound. An HRIR 1l through an HRIR Nl and an HRIR 1r through an HRIR Nr with respect to virtual sound sources corresponding to a direction of arrival of respective reflected sounds are convolved with acoustic signals resulting from RIRs being convolved with the reflected sounds 1 through N.

The HRIR 0l through HRIR Nl indicate transfer characteristics of audio from the virtual sound sources to the left ear of the user U1, and the HRIR 0r through HRIR Nr indicate transfer characteristics of audio from the virtual sound sources to the right ear of the user U1.

Acoustic signals to which the HRIR 0l through HRIR Nl are convolved are added together and reproduced from the left ear side of the headphones, and acoustic signals to which the HRIR 0r through HRIR Nr are convolved are added together and reproduced from the right ear side of the headphones, whereby audio emitted from the sound sources P1 through P3 in the space RM1 is reproduced.

Typically, in order to reproduce the acoustics of a certain space, a BRIR obtained by means of a HATS is used. It is known that, by using a BRIR for a user themselves in place of a BRIR obtained by means of an HATS, it is possible to more accurately reproduce the acoustics of the space.

For example, there is a case in which a BRIR is used to reproduce the acoustics of a studio for producing movie audio and the acoustics are used in the production of the movie audio. In this case, the BRIR used in order to reproduce the acoustics of the studio is measured by outputting audio corresponding to a measurement signal from each speaker in the studio, and collecting this audio by microphones worn on user's ears.

Typically, multiple studios are used separately according to production title or work content. Accordingly, BRIRs corresponding to respective studios become necessary in order to reproduce the acoustics of the respective studios. In order to measure BRIRs corresponding to respective studios, it is not efficient for a user to visit and make a precise measurement of all of the studios.

In contrast to this, PTL 1 describes a technique in which parameters for a direct sound, an initial reflected sound, and late reverberation which are obtained from a BRIR that is able to reproduce a space that will serve as a reference are each independently controlled and a BRIR for a space of interest is generated.

In addition, there is proposed a mechanism in which BRIRs for a direct sound and other audio are each measured in a different environment and these BRIRs are combined, whereby a BRIR for reproducing the acoustics of a certain space is generated. However, it has been difficult to accurately reproduce a BRIR measured in an actual space, even in the technique described in PTL 1 or the above-described mechanism.

An embodiment of the present technique has been conceived of after paying attention to the abovementioned point, and proposes a technique that enable a BRIR for reproducing the acoustics in a space of interest to be accurately reproduced without a user visiting the space. Description is given in detail below regarding the present embodiment.

Configuration of Acoustic Processing System

Figure 3:
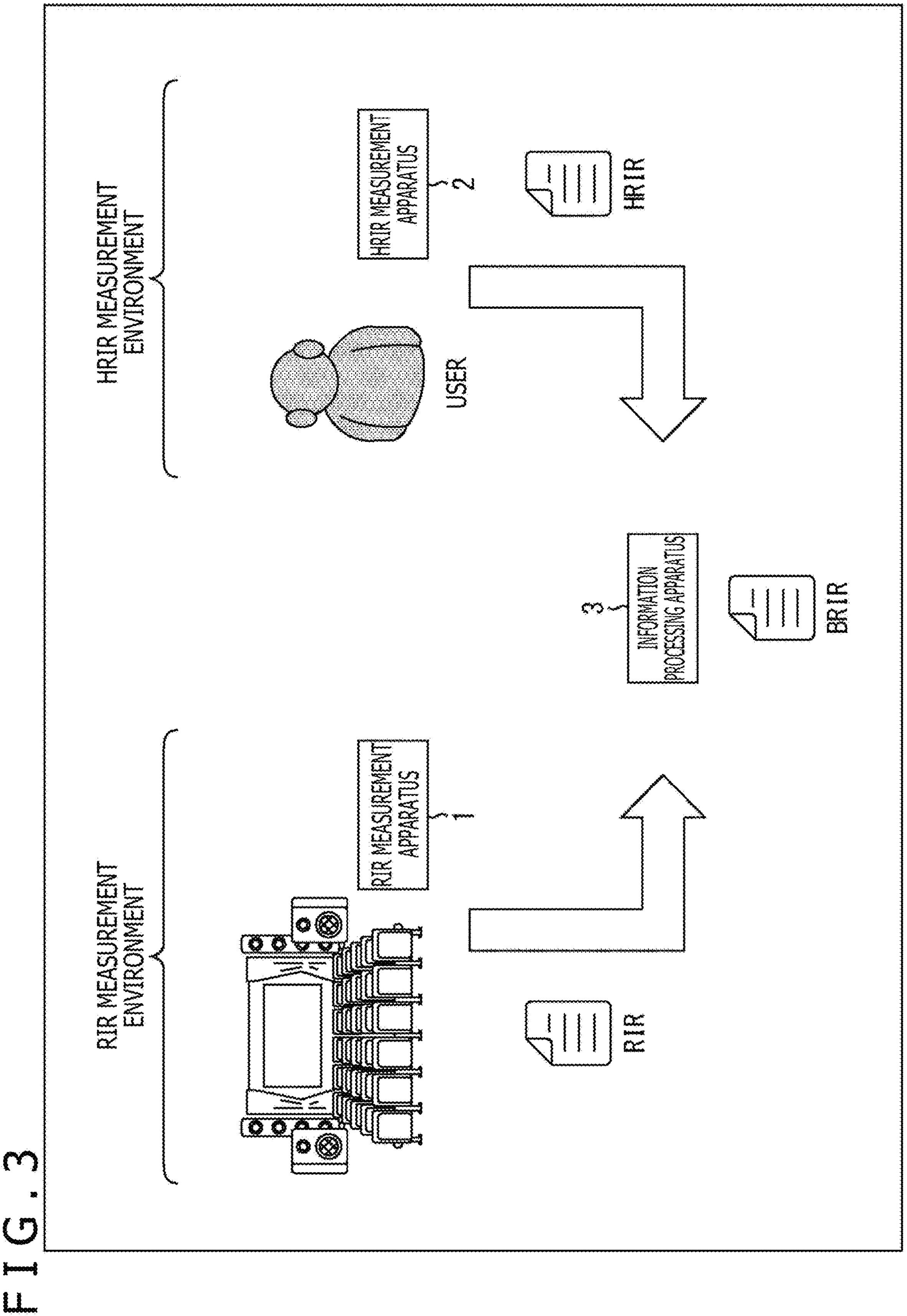
FIG. 3 is a view that illustrates an example of a configuration of an acoustic processing system according to an embodiment of the present technique.

FIG. 3 is a view that illustrates an example of a configuration of an acoustic processing system according to the embodiment of the present technique.

The acoustic processing system in FIG. 3 is a system used to produce audio for a movie, for example.

Audio for a movie includes audio made by people such as narration or dialogue by actors, as well as various types of sounds such as sound effects, an environmental sound, and BGM. In a case where there is no need to distinguish the types of sounds from each other, as appropriate, description is given by collectively referring to audio below, but, in practice, a movie sound also includes types of sounds that are not audio.

As illustrated in FIG. 3, the acoustic processing system includes an RIR measurement apparatus 1, an HRIR measurement apparatus 2, and an information processing apparatus 3.

The RIR measurement apparatus 1 obtains an RIR that indicates a transfer characteristic of audio in an RIR measurement environment. The RIR measurement environment is referred to as a dubbing stage or the like, and is a movie theater that is used for audio production. A screen as well as multiple speakers are provided in the movie theater.

The HRIR measurement apparatus 2 obtains an HRIR that indicates a transfer characteristic of audio for both ears of a user in an HRIR measurement environment such as an anechoic room or a listening room. A producer of movie audio will be a user, and an HRIR that has been personalized for the user is measured.

The information processing apparatus 3 combines the RIR obtained by the RIR measurement apparatus 1 with the HRIR that is for the user and is obtained by the HRIR measurement apparatus 2, to thereby generate a BRIR. Reproduction using this BRIR is performed, whereby audio outputted from the speakers in the movie theater that corresponds to the RIR measurement environment is reproduced.

The RIR measurement apparatus 1, the HRIR measurement apparatus 2, and the information processing apparatus 3 each include a PC, for example. Note that the RIR measurement apparatus 1, the HRIR measurement apparatus 2, and the information processing apparatus 3 may be configured as one apparatus.

Figure 4B:
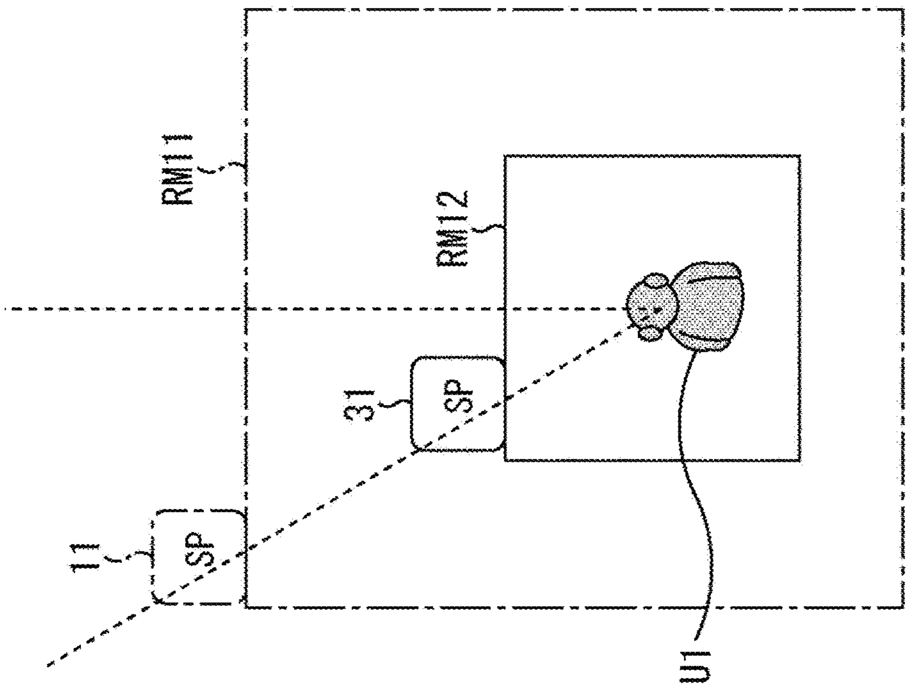
FIGS. 4A and 4B are views that illustrate examples of an RIR measurement environment and an HRIR measurement environment.
Figure 4A:
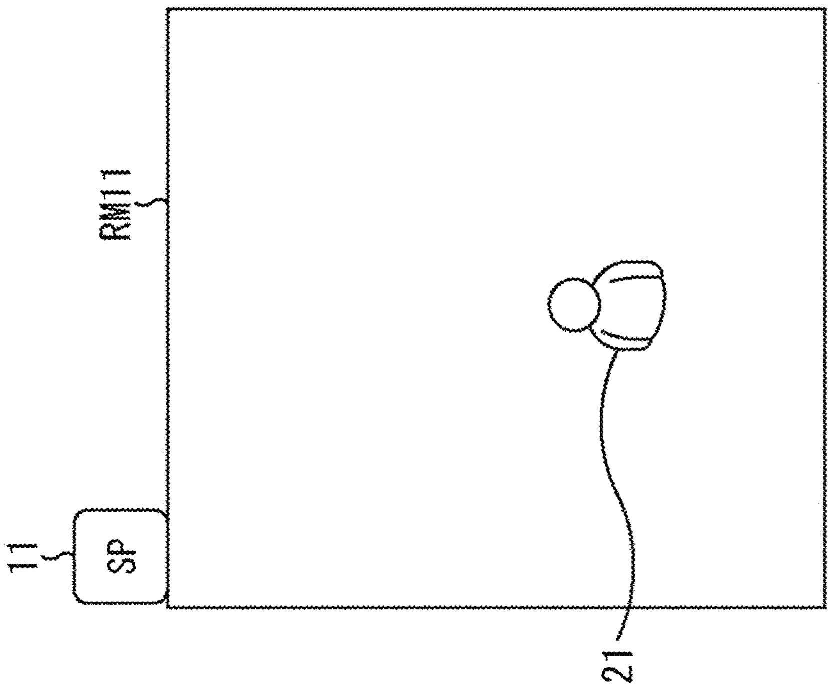

FIGS. 4A and 4B are views that illustrates examples of an RIR measurement environment and an HRIR measurement environment.

A speaker 11 that serves as a sound source is disposed in a studio RM11, which corresponds to the RIR measurement environment illustrated in FIG. 4A. In addition, an HATS (no-ears HATS) 21, which is not provided with pinna sections, is disposed at the position of a seat, which is in the studio RM11 and on which a user virtually sits for the purpose of movie audio production. Microphones are provided at both ear portions for the no-ears HATS 21.

In this state, a reproduced sound is outputted from the speaker 11, and the reproduced sound is collected by the no-ears HATS 21, whereby a BRIR that is for the no-ears HATS 21 and indicates a transfer characteristic of audio from the speaker 11 in the studio RM11 to both ears of the no-ears HATS 21 is measured. The position in the studio RM11 at which the no-ears HATS 21 is disposed becomes a measurement position for the BRIR for the no-ears HATS 21. On the basis of the BRIR for this no-ears HATS 21, an RIR that indicates a transfer characteristic of audio in the studio RM11 is obtained. A method of obtaining the RIR is described below.

A speaker 31 that serves as a sound source is disposed in an anechoic room RM12, which corresponds to an HRIR obtainment environment illustrated in FIG. 4B. In addition, at a predetermined position in the anechoic room RM12, the user U1 is seated in a state in which microphones have been attached to their ear holes. As indicated by broken lines, the speaker 31 is disposed in the same direction as a direction of the speaker 11 with reference to a measurement position for the BRIR for the no-ears HATS 21, with reference to the position of the user U1.

In this state, a reproduced sound is outputted from the speaker 31, and the reproduced sound is collected by the microphones, whereby an HRIR which is for the user and indicates a transfer characteristic of audio from the speaker 31 to both ears of the user U1 is measured. The position of the user U1 within the anechoic room RM12 becomes a measurement position for an HRIR for the user U1.

Next, description is given regarding a BRIR generation method by the information processing apparatus 3.

Figure 5:
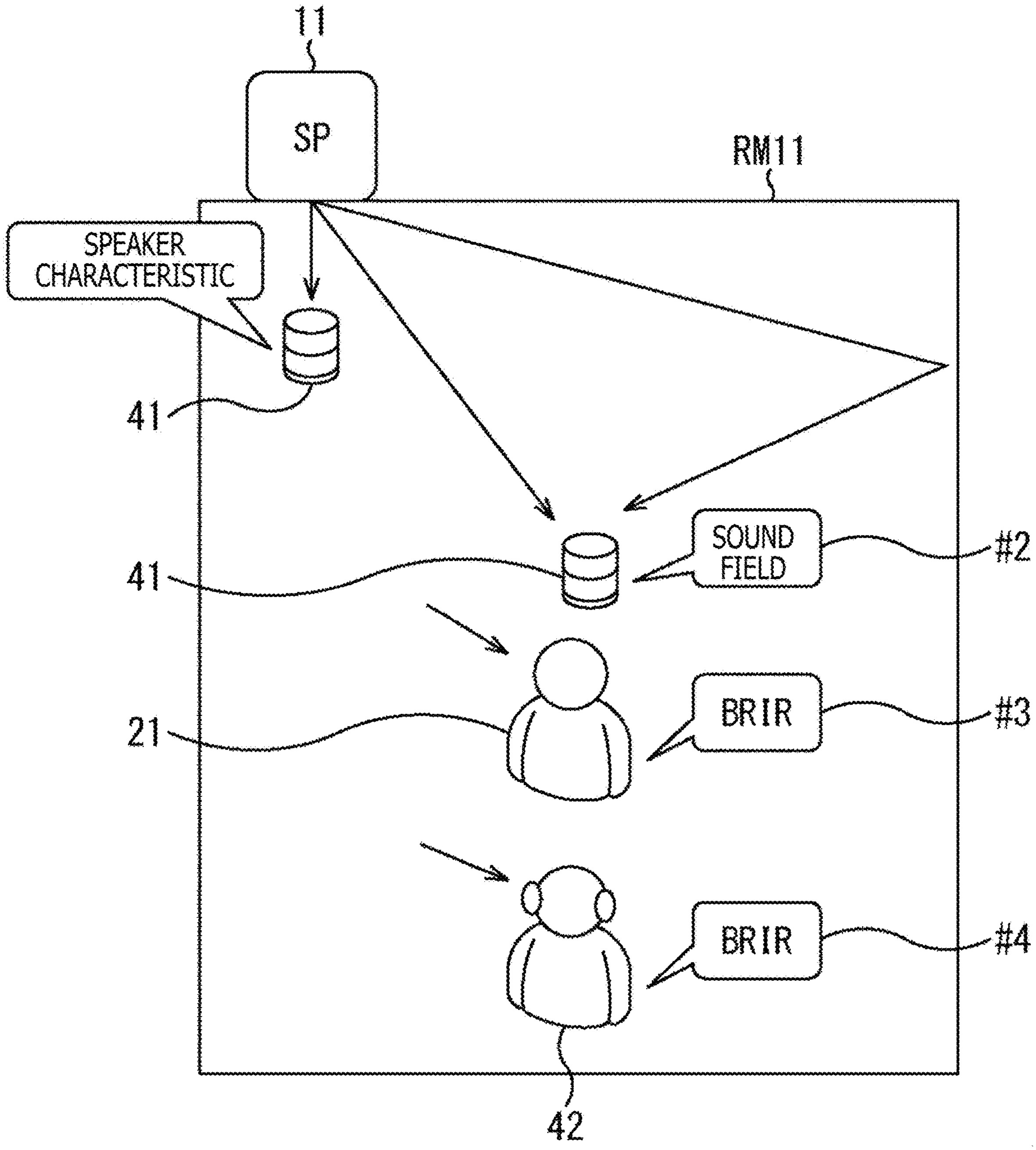
FIG. 5 is a view that illustrates an example of an audio transfer characteristic that can be measured in an RIR measurement environment.

FIG. 5 is a view that illustrates an example of an audio transfer characteristic that can be measured in an RIR measurement environment.

In the studio RM11, it is possible to obtain a characteristic of the speaker 11 itself by a measurement by a microphone 41 disposed at a position that is very close to the speaker 11.

It is also possible to obtain a characteristic that corresponds to the sound field of the studio RM11, by a measurement by a microphone 41 which is disposed at a predetermined position in the studio RM11. This sound field characteristic includes a characteristic of the speaker 11 and a sound quality of the studio RM11.

The BRIR for the no-ears HATS 21 is obtained according to a measurement using the no-ears HATS 21 which is disposed at a predetermined position in the studio RM11. The BRIR for the no-ears HATS 21 includes a characteristic of the speaker 11, the sound quality of the studio RM11, and impact of the head and body portion of the HATS.

According to a measurement using a HATS (has-ears HATS) 42 on which pinna sections are provided and which is disposed at a predetermined position in the studio RM11, a BRIR that is for the has-ears HATS 42 and indicates a transfer characteristic of audio from the speaker 11 in the studio RM11 to both ears of the has-ears HATS 42 is obtained. The BRIR for the has-ears HATS 42 includes a characteristic of the speaker 11, the sound quality of the studio RM11, impact of the head and body portion of the HATS, and impact of the pinna sections of the HATS.

Typically, the BRIR for the has-ears HATS 42 is used in order to reproduce the acoustics of the studio RM11. However, the BRIR for the has-ears HATS 42 can be insufficient as data having an intended use of producing movie audio. This is because the BRIR for the has-ears HATS 42 includes the impact of the pinnas, head, and body portion of the has-ears HATS 42 instead of those belonging to a user and, when the BRIR for the has-ears HATS 42 is used, the reproducibility of the acoustics of the studio RM11, which is important in the production of movie audio, decreases.

In contrast to this, an objective of the acoustic processing system of the present technique is to measure, in an HRIR measurement environment, an HRIR that is for a user and includes the impact of the user's pinnas, head, and body, and use the HRIR for the user to obtain a BRIR that reproduces the acoustics of the studio RM11 in a manner that is more accurate than that of the BRIR for the has-ears HATS 42.

Figure 6:
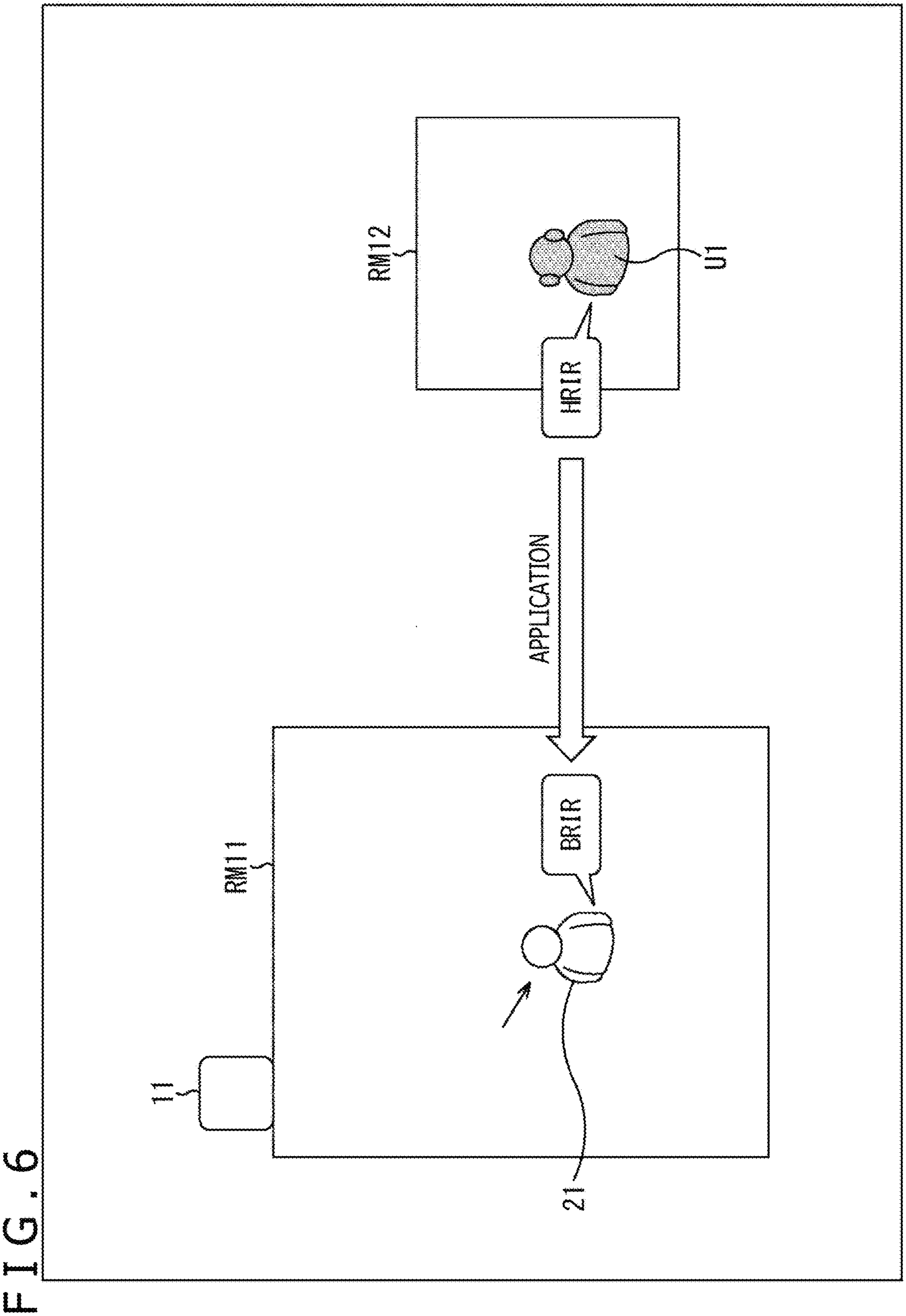
FIG. 6 is a view that illustrates a first example of a BRIR generation method.

FIG. 6 is a view that illustrates a first example of the BRIR generation method.

As described above, the BRIR for the no-ears HATS 21 which is measured in the studio RM11 illustrated in the left side in FIG. 6 includes the characteristic of the speaker 11, the sound quality of the studio RM11, and impact of the HATS. As the impact of the HATS, for example, an ITD (Interaural Time Difference) and an ILD (Interaural Level Difference) that arise in the HATS are included in the BRIR for the no-ears HATS 21.

In contrast, the HRIR for the user U1 that is measured in the anechoic room RM12 illustrated on the right side of FIG. 6 includes, as characteristics of the user, the impact of the pinnas and the ITD and the ILD that arise for the user. The HRIR for the user U1 in practice also includes a characteristic of the speaker 31 disposed in the anechoic room RM12, but this characteristic is canceled in advance.

Accordingly, in a case of combining the BRIR for the no-ears HATS 21 and the HRIR for the user U1 unchanged to thereby generate a BRIR for reproducing the acoustics of the studio RM11, the generated BRIR includes the ITD and the ILD of the HATS, as well as a characteristic of the speaker 11, the sound quality of the studio RM11, and characteristics of the user. In order to obtain a BRIR that is equivalent to a BRIR that is actually measured in the studio RM11 by the user U1, it is necessary to cancel the ITD and the ILD of the HATS from the BRIR for the no-ears HATS 21.

Figure 7:
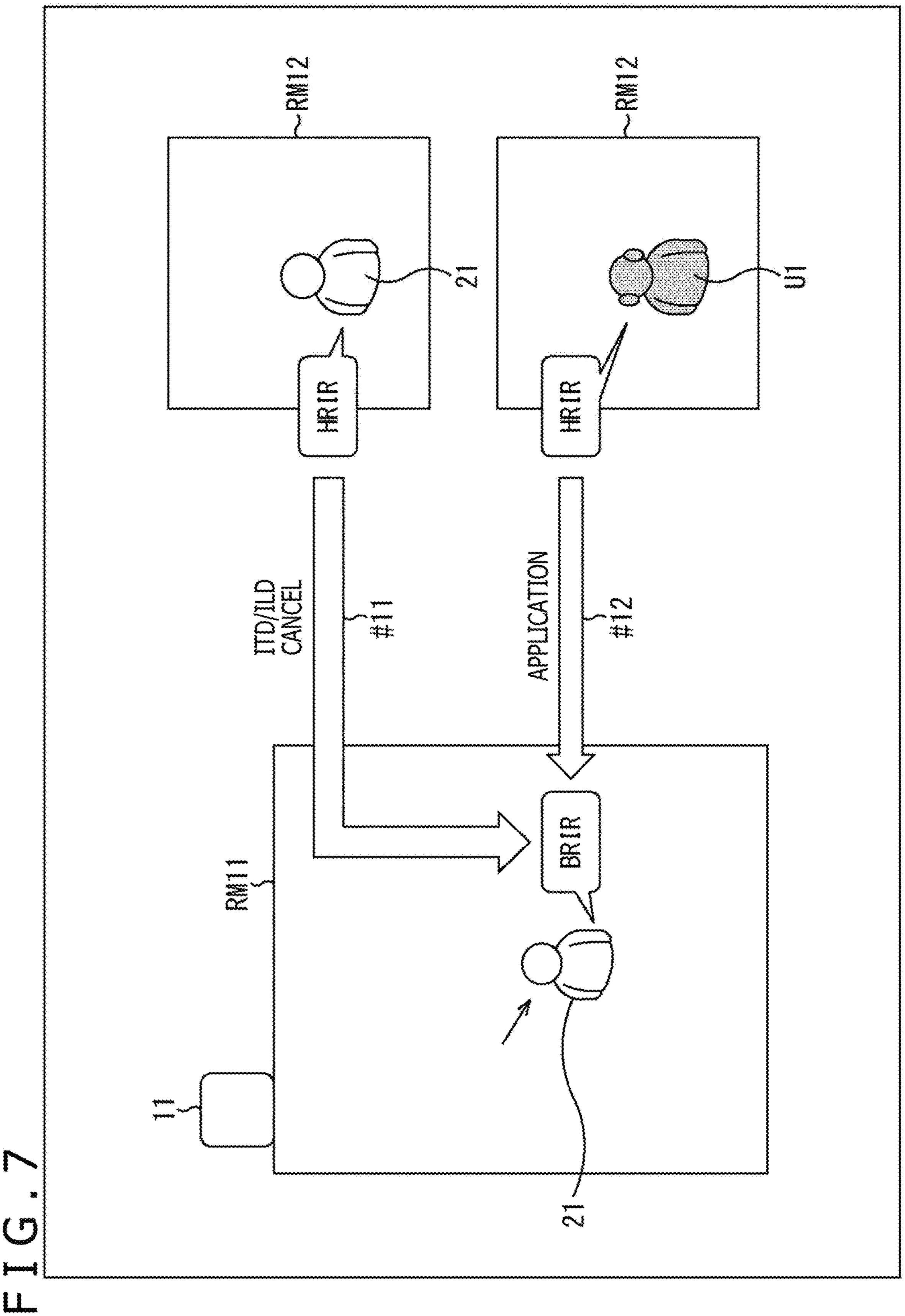
FIG. 7 is a view that illustrates a second example of the BRIR generation method.

FIG. 7 is a view that illustrates a second example of the BRIR generation method.

Accordingly, as illustrated by a hollow arrow #11 in FIG. 7, on the basis of the HRIR for the no-ears HATS 21 measured in the anechoic room RM12, the information processing apparatus 3 cancels the ITD and the ILD of the HATS that are included in the BRIR for the no-ears HATS 21. Note that the HRIR for the no-ears HATS 21 is measured under the same conditions as the conditions under which the HRIR for the user U1 has been measured, for example.

Figure 8:
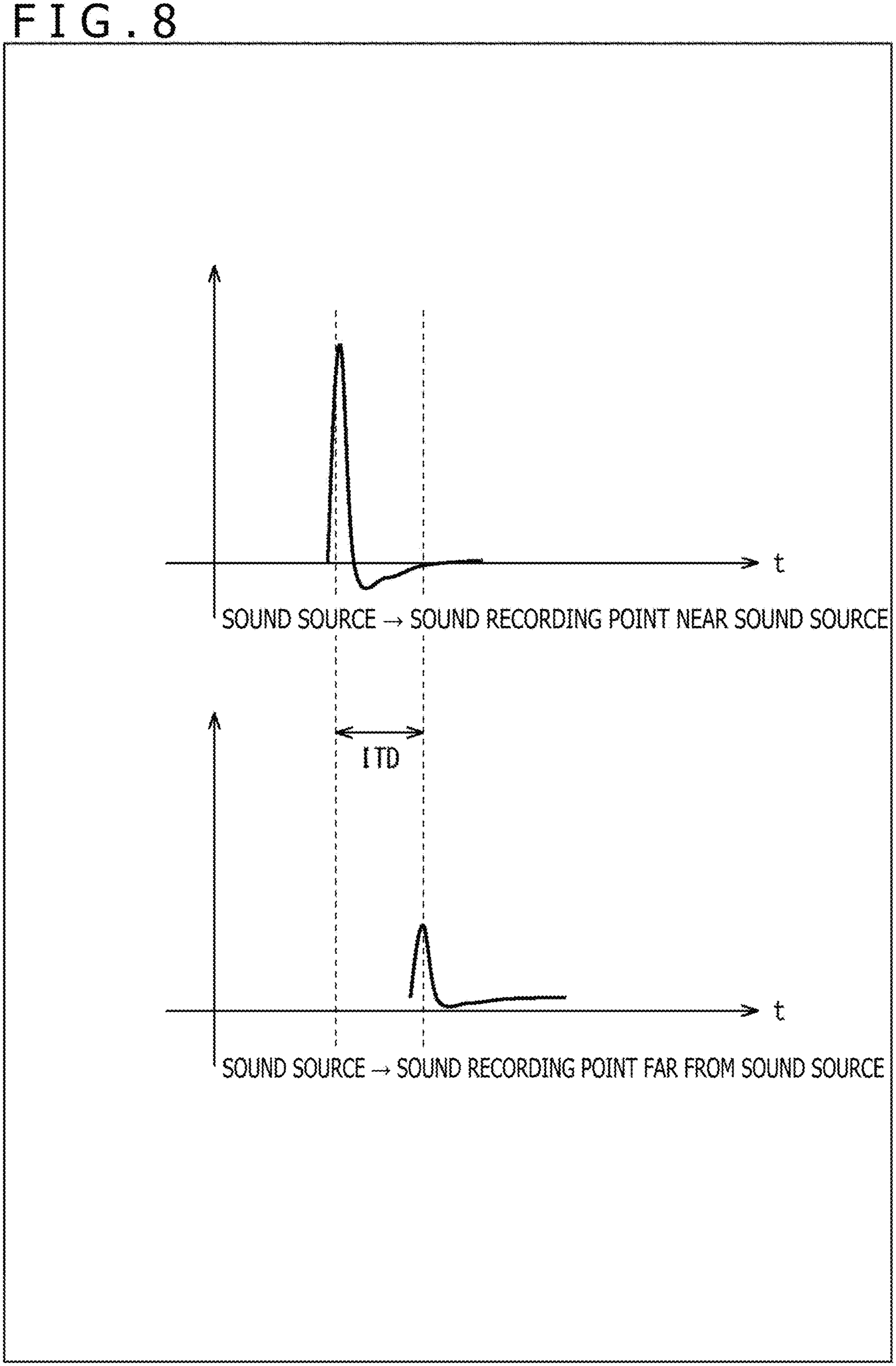
FIG. 8 is a view that illustrates an example of an ITD calculation method.

FIG. 8 is a view that illustrates an example of an ITD calculation method. FIG. 8 illustrates an HRIR that are for each of the left and right ears of the no-ears HATS 21 and are measured in the anechoic room RM12. In FIG. 8, the horizontal axis indicates time, and the vertical axis indicates amplitude.

Here, the left ear among the left and right ears is set as a sound recording point that is close to the speaker 31, which serves as a sound source. The information processing apparatus 3 calculates, as an ITD, a time difference between an amplitude peak for an HRIR that is for the left ear and is illustrated in the upper level of FIG. 8 and an amplitude peak for an HRIR that is for the right ear and is illustrated in the lower level of FIG. 8. The information processing apparatus 3 cancels this time difference, which arises between both ears of the no-ears HATS 21, from the BRIR for the no-ears HATS 21.

FIGS. 9A, 9B, 10A, and 10B are views that illustrate a flow for canceling an ILD. In FIGS. 9A, 9B, 10A, and 10B the horizontal axis indicates frequency, and the vertical axis indicates a gain.

Figure 9B:
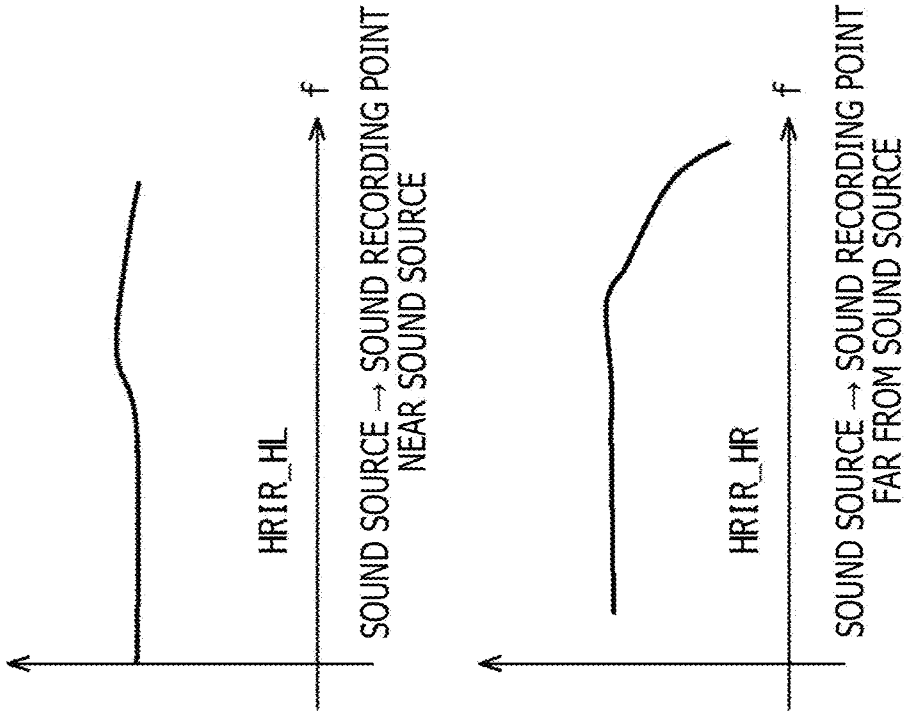
FIGS. 9A and 9B are views that illustrate a flow for canceling an ILD.
Figure 9A:
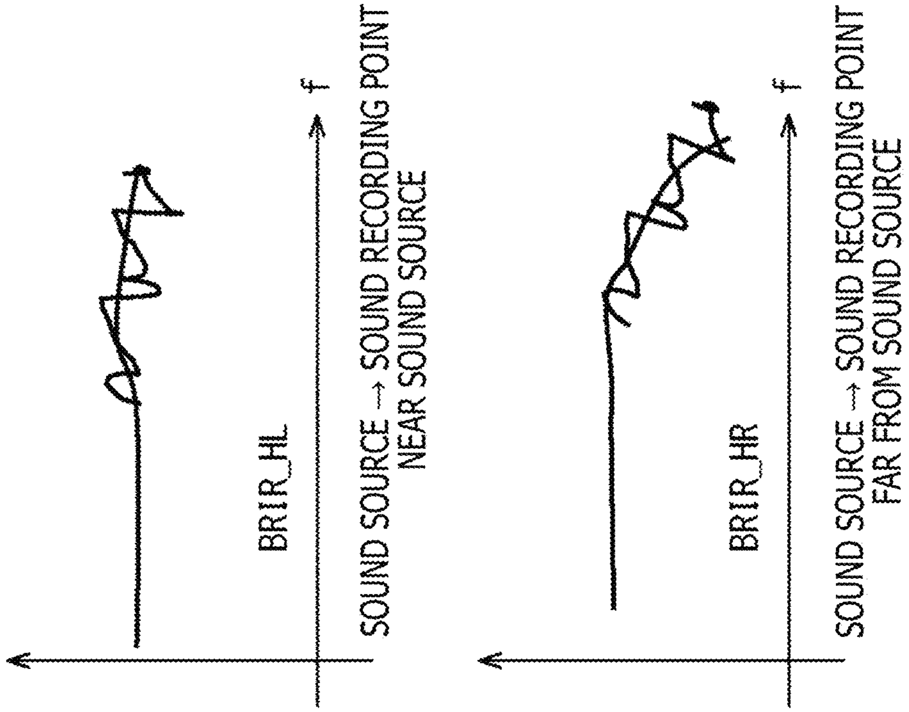
Figure 10B:
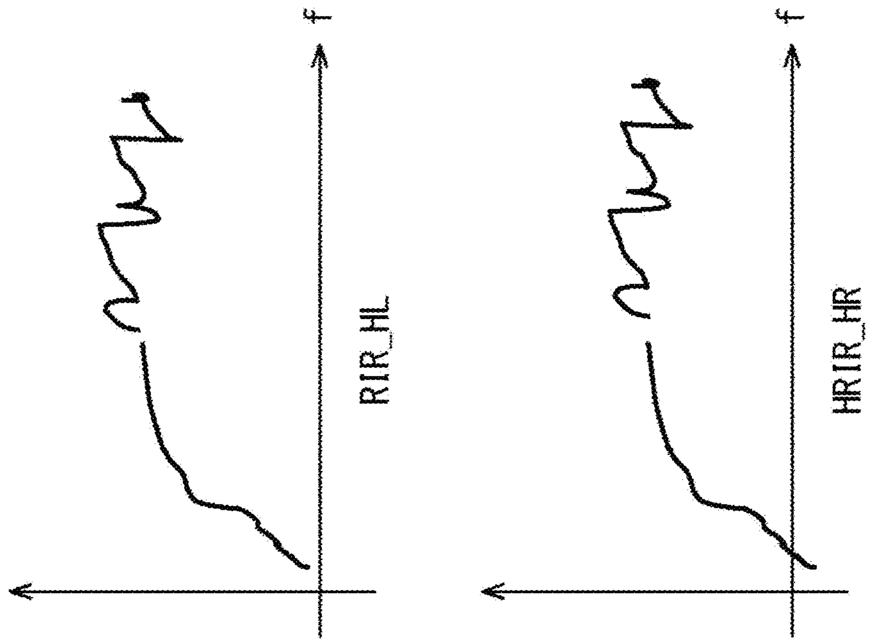
FIGS. 10A and 10B are views that illustrate the flow for canceling the ILD.
Figure 10A:
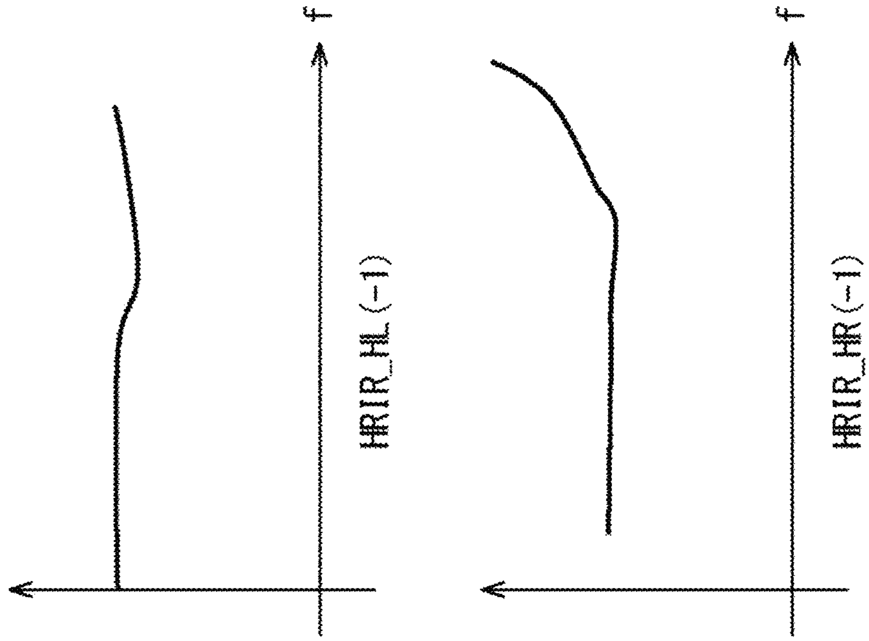

BRIR_HL that is the BRIR for the left ear of the no-ears HATS 21 is illustrated in the frequency domain (BRTF) in the upper level of FIG. 9A, and BRIR_HR that is the BRIR for the right ear of the no-ears HATS 21 is illustrated in the frequency domain (BRTF) in the lower level thereof. BRIR_HL and BRIR_HR are indicated by the following formulas (1) and (2).

[Math. 1]

$$BRIR\_HL = HRIR\_HL * RIR\_HL \quad (1)$$

$$BRIR\_HR = HRIR\_HR * RIR\_HR \quad (2)$$

In formulas (1) and (2), HRIR_HL is the HRIR for the left ear of the no-ears HATS 21, and HRIR_HR is the HRIR for the right ear of the no-ears HATS 21. HRIR_HL is illustrated in the frequency domain (HRTF) in the upper level of FIG. 9B, and HRIR_HR is illustrated in the frequency domain (HRTF) in the lower level thereof. The shape of the head of the HATS is simple. Therefore, data having less reflection or diffraction is measured as the HRIR for the no-ears HATS 21.

On the basis of formulas (1) and (2), RIR_HL that is the RIR for the left ear of the no-ears HATS 21 and an RIR that is for the right ear of the no-ears HATS are obtained as in the following formulas (3) and (4). In the following formulas (3) and (4), HRIR_HL(−1) is an inverse function of HRIR_HL, and HRIR_HR(−1) is an inverse function of HRIR_HR. HRIR_HL(−1) is illustrated in the frequency domain in the upper level of FIG. 10A, and HRIR_HR(−1) is illustrated in the frequency domain in the lower level thereof.

[Math. 2]

$$RIR\_HL = BRIR\_HL * HRIR\_HL(-1) \quad (3)$$

$$RIR\_HR = BRIR\_HR * HRIR\_HR(-1) \quad (4)$$

The information processing apparatus 3 uses the calculations indicated by the formulas (3) and (4) to cancel the HATS ILD from BRIR_HL and BRIR_HR, and extracts RIR_HL and RIR_HR. RIR_HL is illustrated in the frequency domain (RTF) in the upper level of FIG. 10B, and RIR_HR is illustrated in the frequency domain (RTF) in the lower level of FIG. 10B.

BRIR_UL that is a BRIR for the left ear of the user U1 and BRIR UR that is a BRIR for the right ear of the user U1 are respectively obtained by convolving RIR_HL with HRIR_UL and convolving RIR_HR with HRIR_UR, as indicated by the following formulas (5) and (6). HRIR_UL is an HRIR for the left ear of the user U1, and HRIR_UR is an HRIR for the right ear of the user U1.

[Math. 3]

$$BRIR\_UL = RIR\_HL * HRIR\_UL \quad (5)$$

$$BRIR\_UR = RIR\_HR * HRIR\_UR \quad (6)$$

As above, the information processing apparatus 3 cancels the ITD and the ILD of the HATS from the BRIR for the no-ears HATS 21.

Described with reference to FIG. 7 again, as indicated by a hollow arrow #12, the information processing apparatus 3 can combine the HRIR for the user U1 with the BRIR (RIR) of the no-ears HATS 21 from which an ITD and an ILD of the HATS has been canceled, to thereby generate a BRIR that is equivalent to a BRIR that the user U1 has actually measured in the studio RM11. In other words, the information processing apparatus 3 can replace the ITD and the ILD of the HATS which are included in the BRIR for the no-ears HATS 21 with an ITD and an ILD of the user U1.

Figure 11:
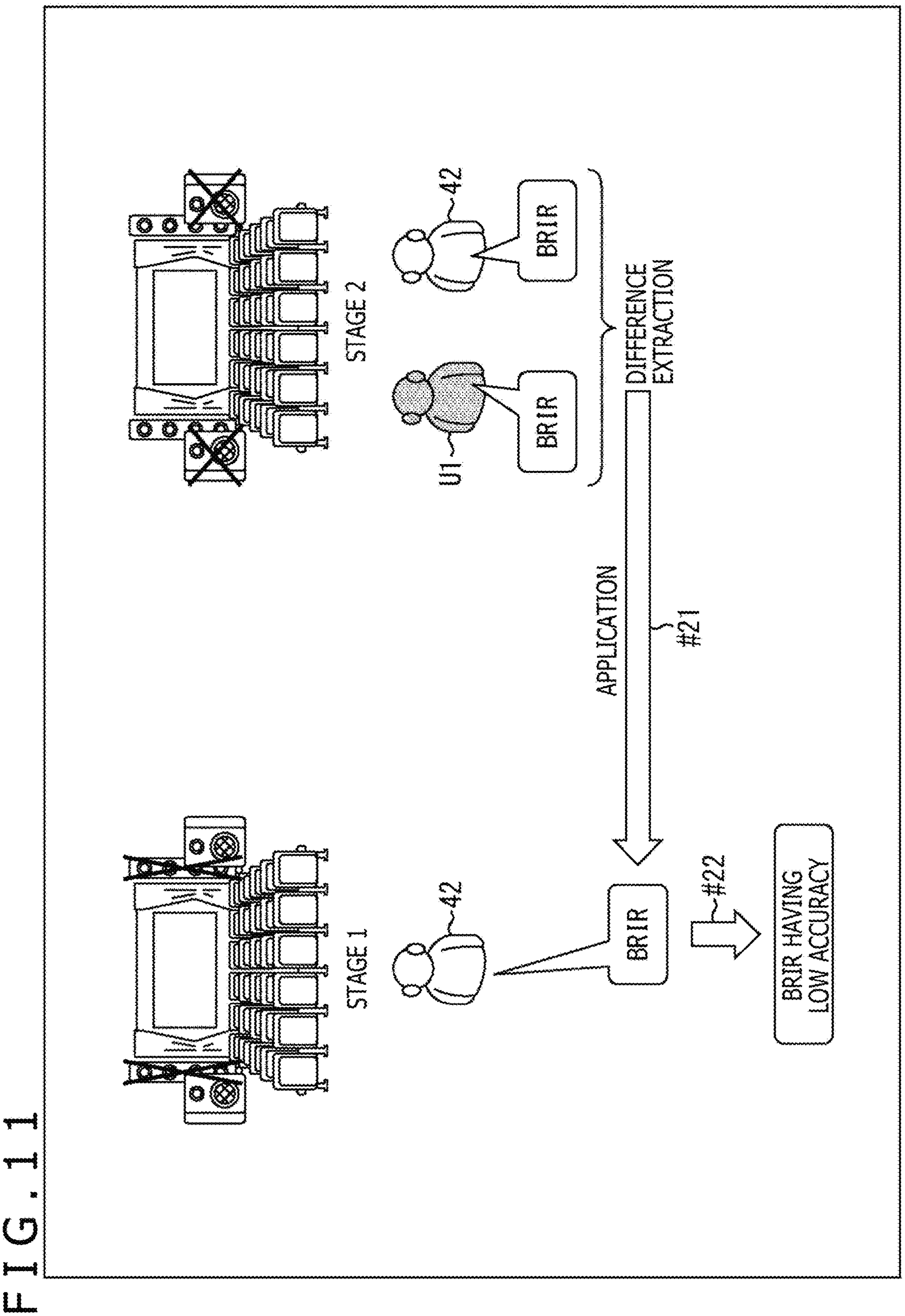
FIG. 11 is a view that illustrates an example of a conventional BRIR generation method.

FIG. 11 is a view that illustrates an example of a conventional BRIR generation method.

There is a method in which the user U1 uses a BRIR measured in a stage 2, to obtain a BRIR for reproducing the acoustics of a stage 1.

For example, this method is a method in which, as illustrated on the right side of FIG. 11, a difference between the BRIR for the user U1 and the BRIR for the has-ears HATS 42 that are measured at the stage 2 is extracted and, as indicated by a hollow arrow #21, this difference data is applied to a BRIR for the has-ears HATS 42 which is measured at the stage 1. As a result, there is an objective of reproducing the BRIR that is measured at the stage 1 by the user U1.

In a case where the distance or the disposed position of a speaker with respect to the measurement position for the BRIR for the has-ears HATS 42 at the stage 1 is treated as being completely equal to the distance or disposed position of a speaker with respect to the measurement position of the has-ears HATS 42 and the user U1 at the stage 2, it is expected that a BRIR having a comparatively high accuracy will be generated. However, in a case where the disposed positions of the speakers differ even slightly, a BRIR having a low accuracy may be generated, as indicated by a hollow arrow #22.

Figure 12:
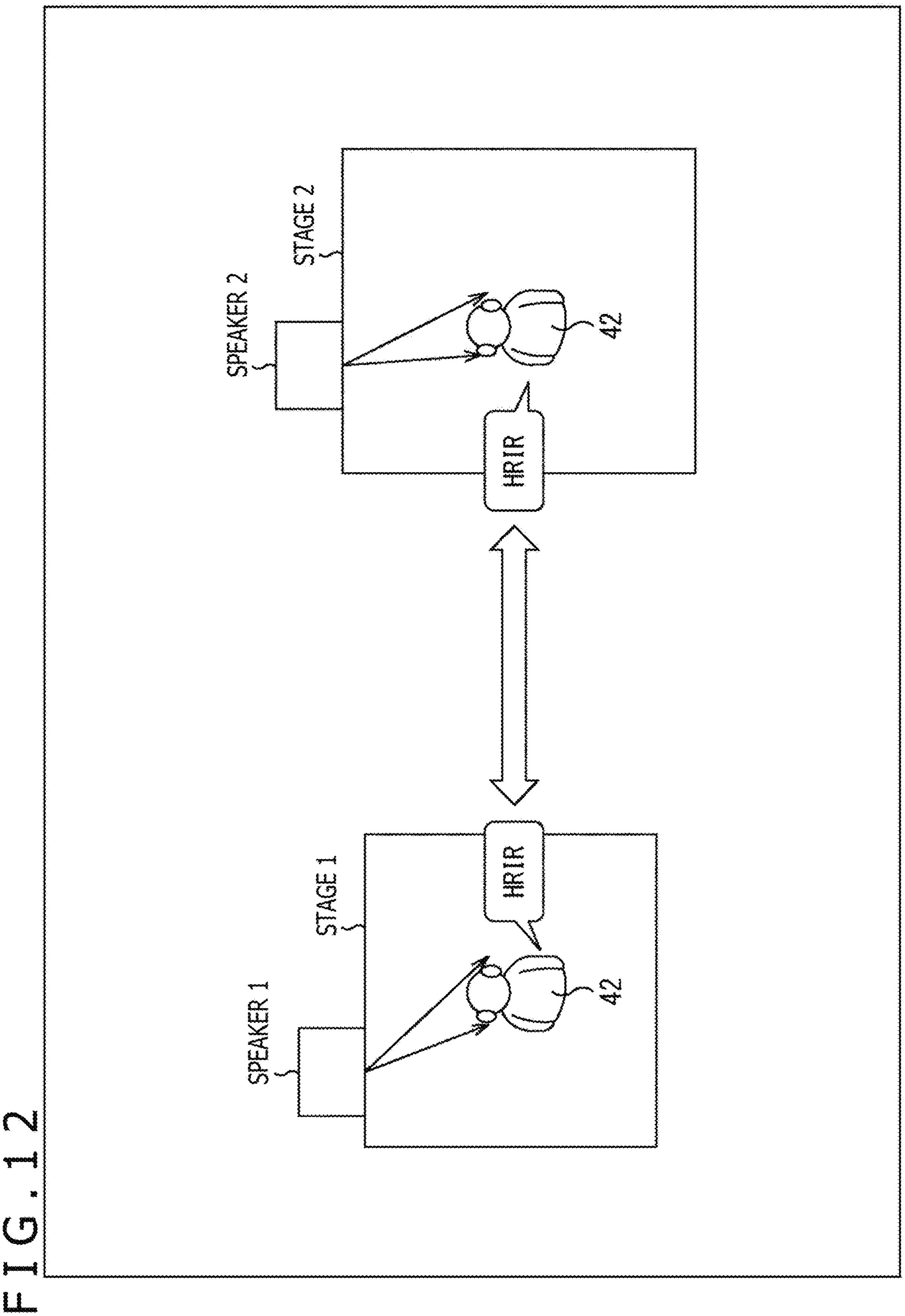
FIG. 12 is a view that illustrates HRIR change that accompanies change in the position of a speaker.

As illustrated in FIG. 12, when the disposed position of a speaker changes from the disposed position of a speaker 1 at the stage 1 to the disposed position of a speaker 2 at the stage 2, the HRIR for the has-ears HATS 42 also changes. Similarly, the HRIR for the user U1 also changes. At this point, the manner in which the HRIR for the has-ears HATS 42 and the HRIR for the user U1 change is not the same.

Accordingly, data regarding the difference between the BRIR for the has-ears HATS 42 and the BRIR for the user U1 measured at the stage 2 does not match data regarding the difference between the BRIR for the has-ears HATS 42 and the BRIR for the user U1 measured at the stage 1. Therefore, it is difficult to accurately reproduce a BRIR that the user U1 has measured at the stage 1, with the conventional BRIR generation method described above.

Note that, in a case where there is completely the same manner of change, in conjunction with change of the disposed position of a speaker, for the HRIR for the user U1 and the has-ears HATS 42, it is possible to accurately reproduce a BRIR that is measured by the user U1 at the stage 1, with the conventional BRIR generation method described above.

In the acoustic processing system of the present technique, an HRIR measurement is performed in such a manner that a direction of the speaker 11 with respect to a BRIR measurement position in an RIR measurement environment is the same as a direction of the speaker 31 with respect to an HRIR measurement position in an HRIR measurement environment.

In addition, when an HRIR and an RIR are combined in the acoustic processing system, a gain for the HRIR for the user U1 is adjusted according to the distance from the measurement position for the BRIR for the no-ears HATS 21 to the speaker 11 in the RIR measurement environment. By adjusting the gain, it is possible to cause the position (direction and distance) of the speaker 11 with reference to the measurement position for the BRIR for the no-ears HATS 21 to virtually match the position (direction and distance) of the speaker 31 with reference to the measurement position for the HRIR for the user U1.

In such a manner, the acoustic processing system combines an RIR with an HRIR that corresponds to the positional relation between the speaker 11 and the measurement position for the BRIR for the no-ears HATS 21 in the RIR measurement environment, making it possible to accurately reproduce a BRIR that the user U1 has measured at the stage 1. Accordingly, if a user visits an HRIR measurement environment only once to thereby measure HRIR, the acoustic processing system can obtain, on the basis of an HRIR for the user, a BRIR for reproducing the acoustics of a location that differs to the HRIR measurement environment.

Thus far, it has been necessary for a user to visit each time, inter alia, a movie theater necessary for the production of movie audio and then measure BRIR, but it is sufficient if the user visits the HRIR measurement environment only once to perform a measurement, and thus, is becomes possible to remarkably reduce a load on the user.

<2. Configuration of and Operation of Each Apparatus>

Figure 13:
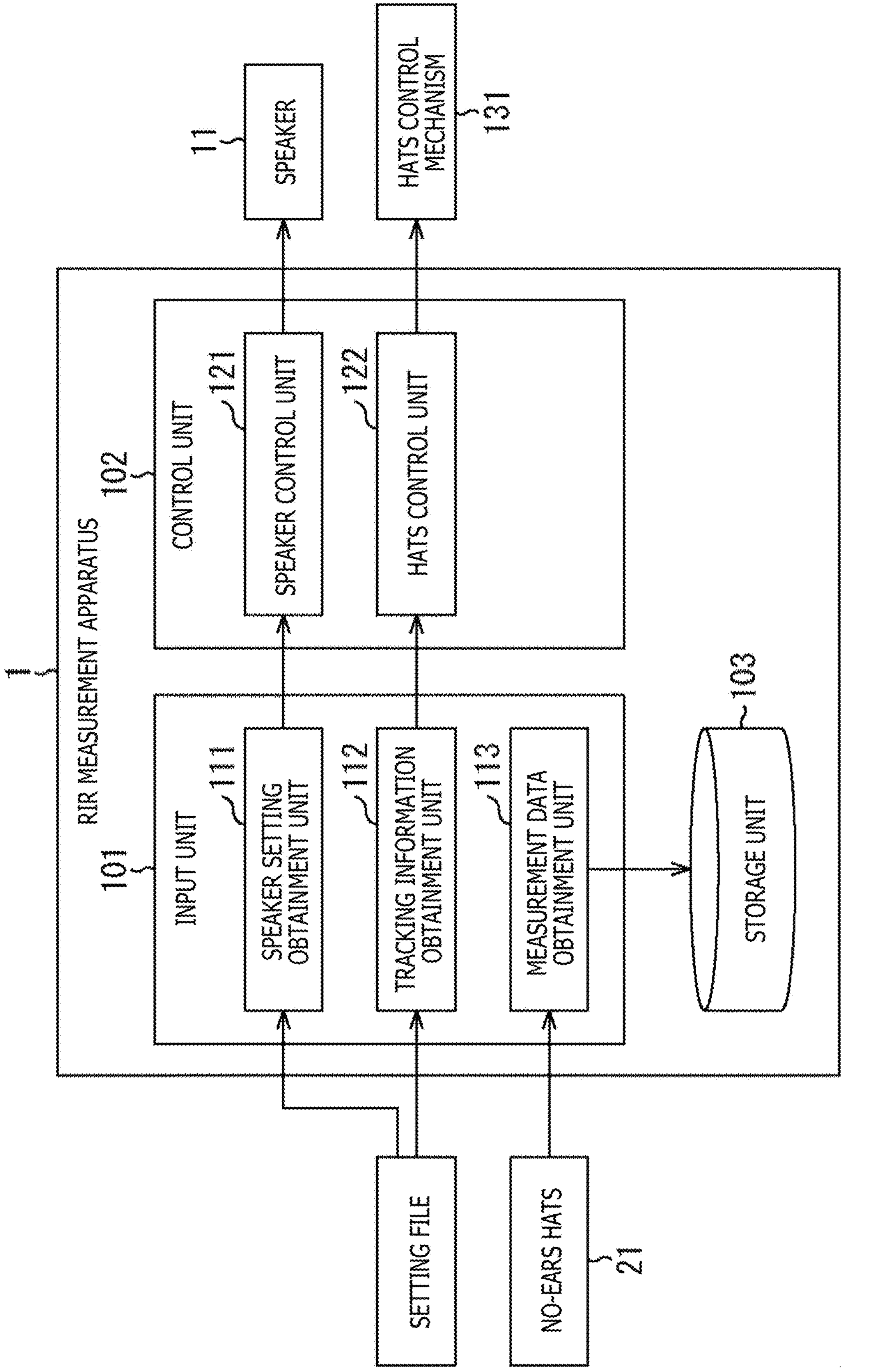
FIG. 13 is a block view that illustrates an example of a functional configuration of an RIR measurement apparatus.

FIG. 13 is a block view that illustrates an example of a functional configuration of the RIR measurement apparatus 1.

As illustrated in FIG. 13, the RIR measurement apparatus 1 includes an input unit 101, a control unit 102, and a storage unit 103.

The input unit 101 is provided with a speaker setting obtainment unit 111, a tracking information obtainment unit 112, and a measurement data obtainment unit 113.

The speaker setting obtainment unit 111 obtains, from a setting file that indicates measurement conditions for an RIR or an HRIR, an audio signal used in the measurement of the BRIR for the no-ears HATS 21, and supplies the audio signal to a speaker control unit 121 in the control unit 102.

The tracking information obtainment unit 112 obtains, from the setting file, information indicating a direction of the no-ears HATS 21 when an BRIR is measured, and supplies the information to a HATS control unit 122 in the control unit 102.

The measurement data obtainment unit 113 obtains a BRIR that is measured using the no-ears HATS 21, and causes the storage unit 103 to store the BRIR.

The control unit 102 is provided with the speaker control unit 121 and the HATS control unit 122.

The speaker control unit 121 causes the speaker 11 to output a reproduced sound that corresponds to the audio signal supplied from the speaker setting obtainment unit 111.

The HATS control unit 122 controls, according to the information supplied from the tracking information obtainment unit 112, a HATS control mechanism 131 for controlling a direction of the no-ears HATS 21.

Figure 14:
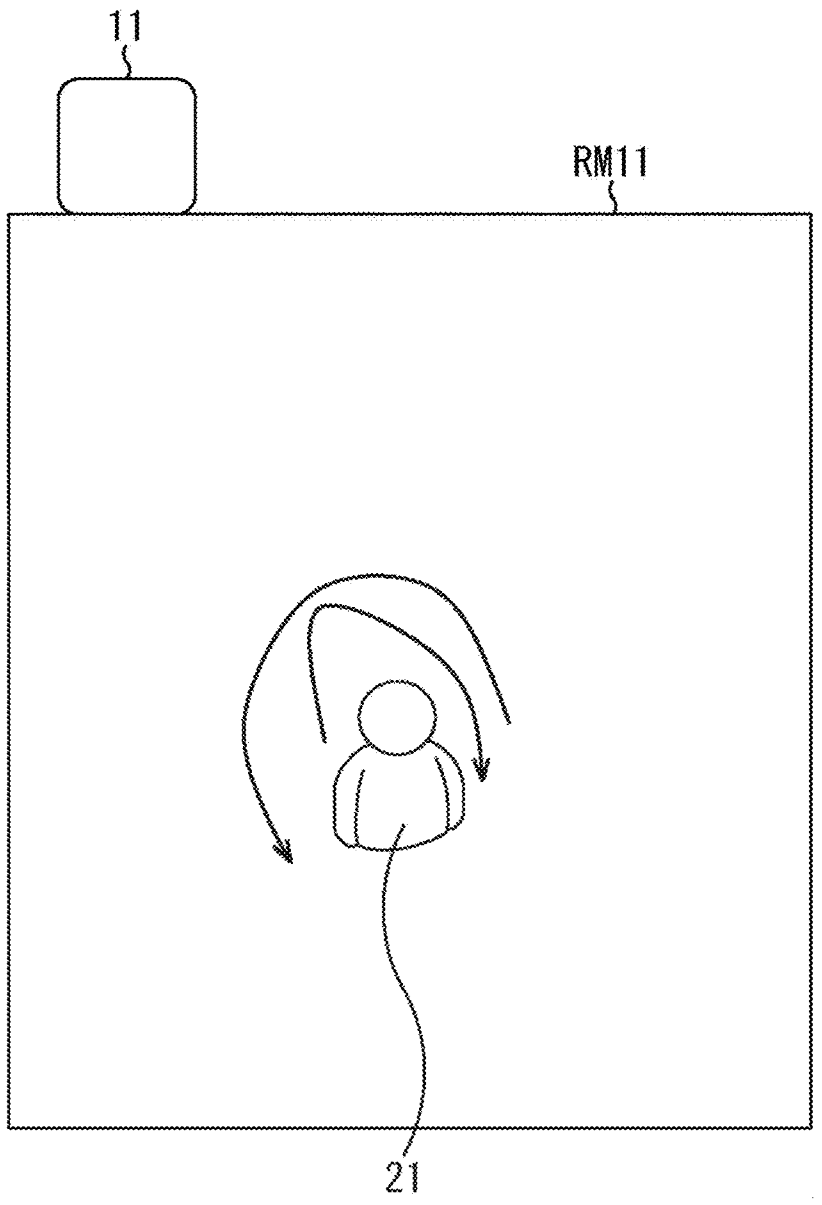
FIG. 14 is a view that illustrates an example of a method for controlling a direction of a no-ears HATS.

FIG. 14 is a view that illustrates an example of a method for controlling the direction of the no-ears HATS 21.

As illustrated by arrows in FIG. 14, the HATS control unit 122 causes the no-ears HATS 21 to measure a BRIR available when the no-ears HATS 21 faces each of multiple directions, while causing the no-ears HATS 21 to rotate up, down, left, and right.

Even in the HRIR measurement environment, an HRIR is measured in a state where the user U1 faces multiple directions. An RIR based on the BRIR for the no-ears HATS 21 corresponding to each direction is combined with an HRIR that is for the user and corresponds to a respective direction, whereby it becomes possible to generate a BRIR available when the user faces each direction in the RIR measurement environment. Reproduction is performed using this BRIR, whereby it is possible to reproduce the acoustics of the RIR measurement environment while supporting head tracking.

Note that the HRIR available when the user U1 faces multiple directions may be obtained using an acoustic simulation.

Figure 15:
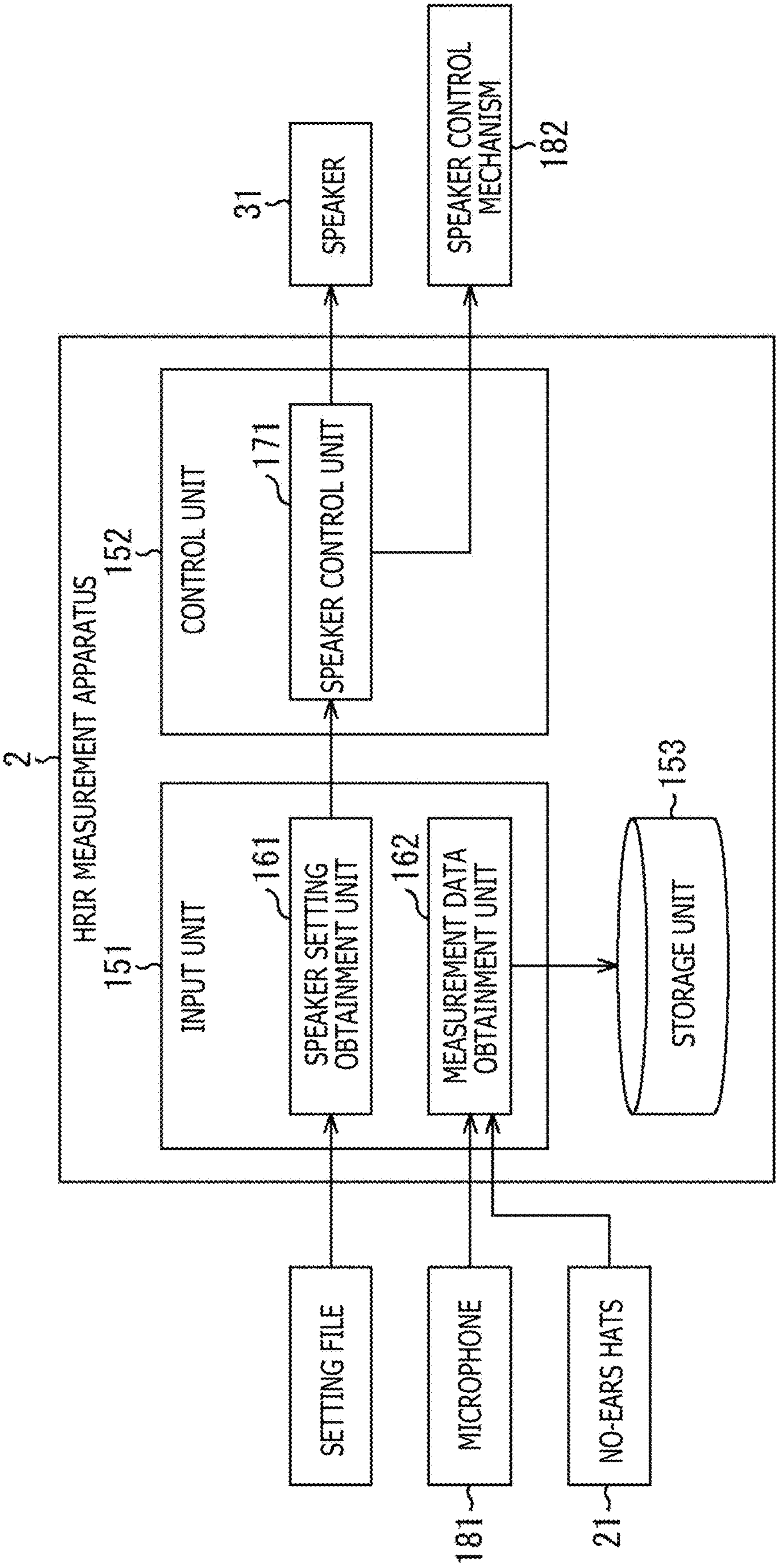
FIG. 15 is a block view that illustrates an example of a functional configuration of an HRIR measurement apparatus.

FIG. 15 is a block view that illustrates an example of a functional configuration of the HRIR measurement apparatus 2.

As illustrated in FIG. 15, the HRIR measurement apparatus 2 includes an input unit 151, a control unit 152, and a storage unit 153.

The input unit 151 is provided with a speaker setting obtainment unit 161 and a measurement data obtainment unit 162.

The speaker setting obtainment unit 161 obtains, from a setting file, an audio signal that is used to measure the HRIR for the user U1 and the HRIR for the no-ears HATS 21 and information that indicates the positional relation between the speaker 11 and the measurement position for the BRIR for the no-ears HATS 21 in the RIR measurement environment, and supplies the audio signal and the information to a speaker control unit 171 in the control unit 152.

The positional relation between the speaker 11 and the measurement position for the BRIR for the no-ears HATS 21 in the RIR measurement environment includes, for example, the direction of the speaker 11 with respect to the measurement position for the BRIR for the no-ears HATS 21 and the distance from the measurement position to the speaker 11.

The positional relation between the measurement position and the speaker 11 is calculated from a three-view drawing or a CAD (Computer Aided Design) drawing of the RIR measurement environment, or obtained according to sensing using a 3D scanner, a laser distance meter, an angle measuring device, or the like. For example, the position of the speaker 11 with reference to the measurement position for the BRIR for the no-ears HATS 21 is obtained on the basis of an image captured by a point cloud scanner. In addition, a device that combines a laser distance meter and a rotary table can simultaneously measure the distance to and direction of the speaker 11 with reference to the measurement position for the BRIR for the no-ears HATS 21.

The measurement data obtainment unit 162 obtains the HRIR that is for the no-ears HATS 21 and is measured using the no-ears HATS 21, as well as an HRIR that is for a user and is measured using the microphones 181, and causes the storage unit 153 to store these HRIRs. The microphones 181 are worn on both ears of the user.

The control unit 152 is provided with the speaker control unit 171. The speaker control unit 171 causes the speaker 31 to output a reproduced sound that corresponds to the audio signal supplied from the speaker setting obtainment unit 161. In addition, the speaker control unit 171, according to information supplied from the speaker setting obtainment unit 161, controls a speaker control mechanism 182 for controlling the position of the speaker 31.

Figure 16B:
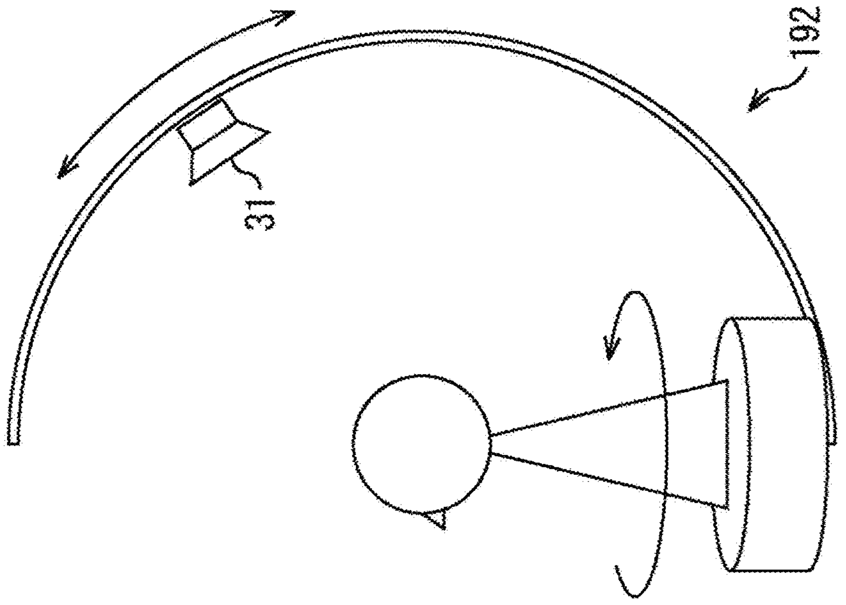
FIGS. 16A and 16B are views that illustrate examples of methods for controlling the position of a speaker.
Figure 16A:
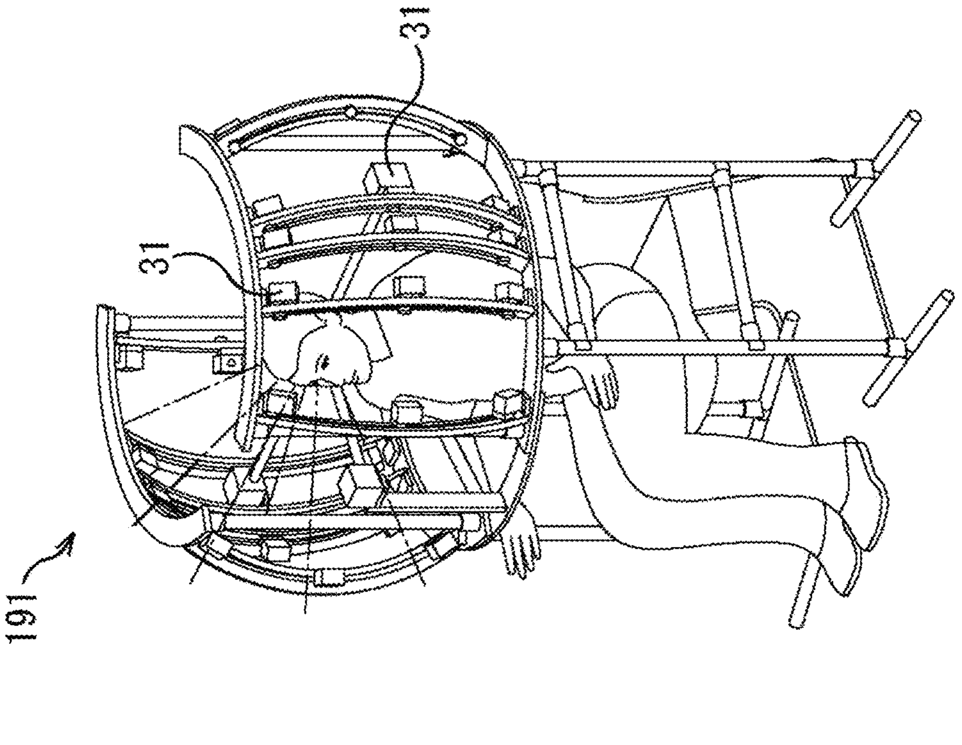

FIGS. 16A and 16B are views that illustrates an example of a method for controlling the position of the speaker 31.

For example, the speaker control mechanism 182 includes a movable multi-speaker rig 191 in which multiple speakers 31 are provided on a spherical surface that surrounds a user or the no-ears HATS 21, as illustrated in FIG. 16A.

Alternatively, for example, the speaker control mechanism 182 includes a movable speaker apparatus 192 as illustrated in FIG. 16B. The movable speaker apparatus 192 can move the speaker 31 on a semicircular rail and cause a user or the no-ears HATS 21 to rotate in the horizontal direction on a rotary table to thereby move the speaker 31 to any position on a spherical surface with reference to the position of the user or the no-ears HATS 21.

The speaker control unit 171 controls the movable multi-speaker rig 191 or the movable speaker apparatus 192 such that the speaker 31 is disposed in a direction that is the same as the direction of the speaker 11 with respect to the measurement position for the BRIR for the no-ears HATS 21, with reference to a measurement position for the HRIR for the user U1 or the no-ears HATS 21.

Figure 17:
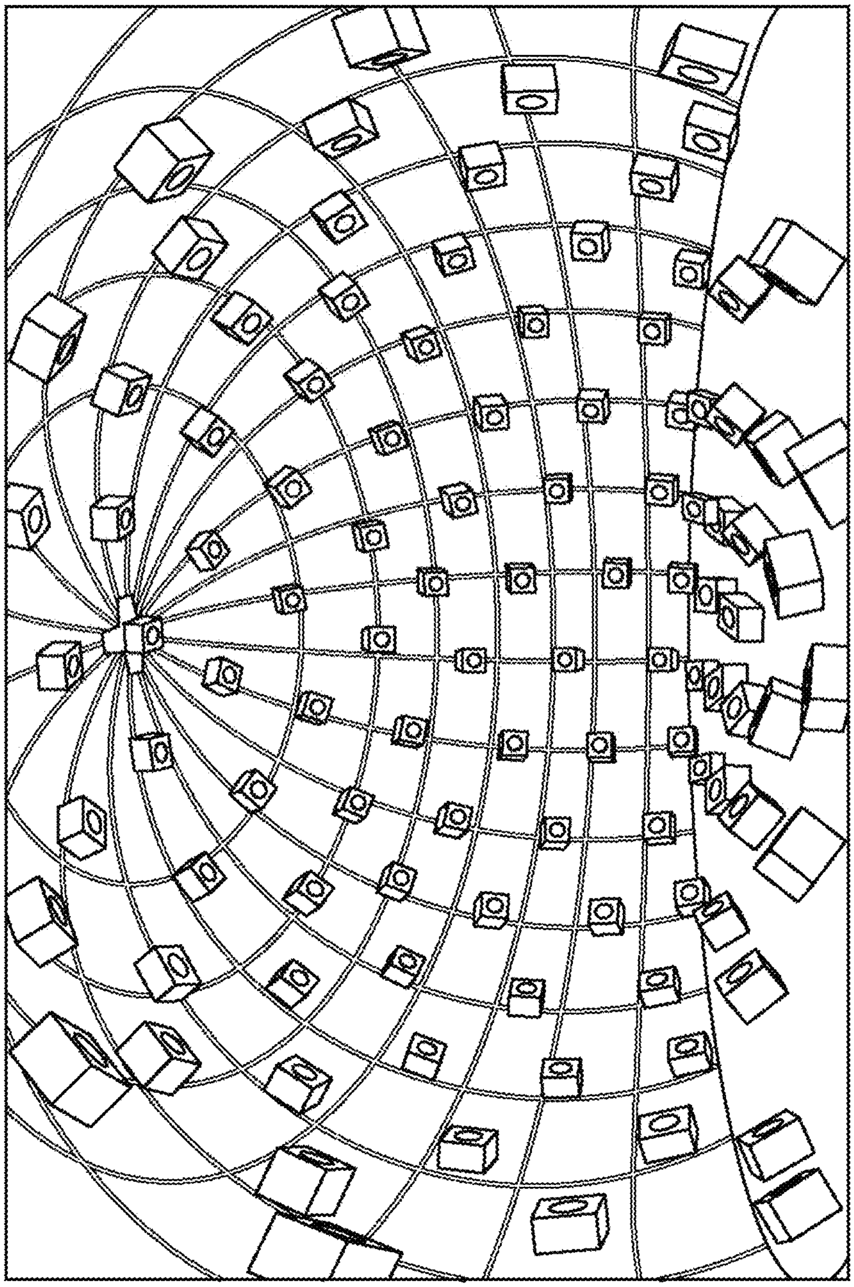
FIG. 17 is a view that illustrates an example of an ultra-multi ch speaker.

Note that, as illustrated in FIG. 17, HRIRs for the user U1 and the no-ears HATS 21 may be measured using an ultra-multi ch (channel) speaker system such as one in which multiple speakers 31 are disposed on a spherical wall surface and on a bottom surface. Here, for example, the multiple speakers 31 are disposed in such a manner as to face an HRIR measurement position, at positions that are centered on the HRIR measurement position and are separated therefrom by only 2 m.

Figure 18:
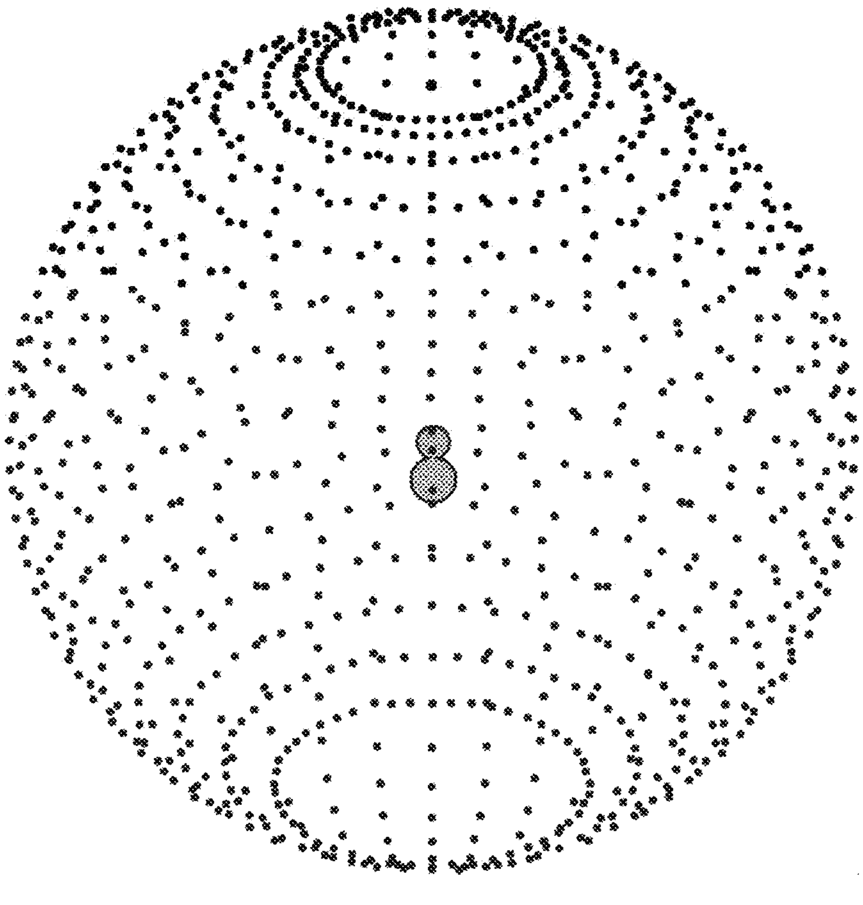
FIG. 18 is a view that illustrates an example of measured HRIRs.

When a reproduced sound is outputted from each speaker 31 and an HRIR is measured, HRIRs with respect to the speakers 31 which are disposed omnidirectionally and centered on the HRIR measurement position are measured, as illustrated in FIG. 18.

In this case, the information processing apparatus 3 selects, from among these multiple HRIRs, an HRIR with respect to the speaker 31 that is disposed at coordinates closest to coordinate information of the speaker 11 which is set with reference to the measurement position for the BRIR for the no-ears HATS 21, and uses the selected HRIR to generate a BRIR.

Figure 19:
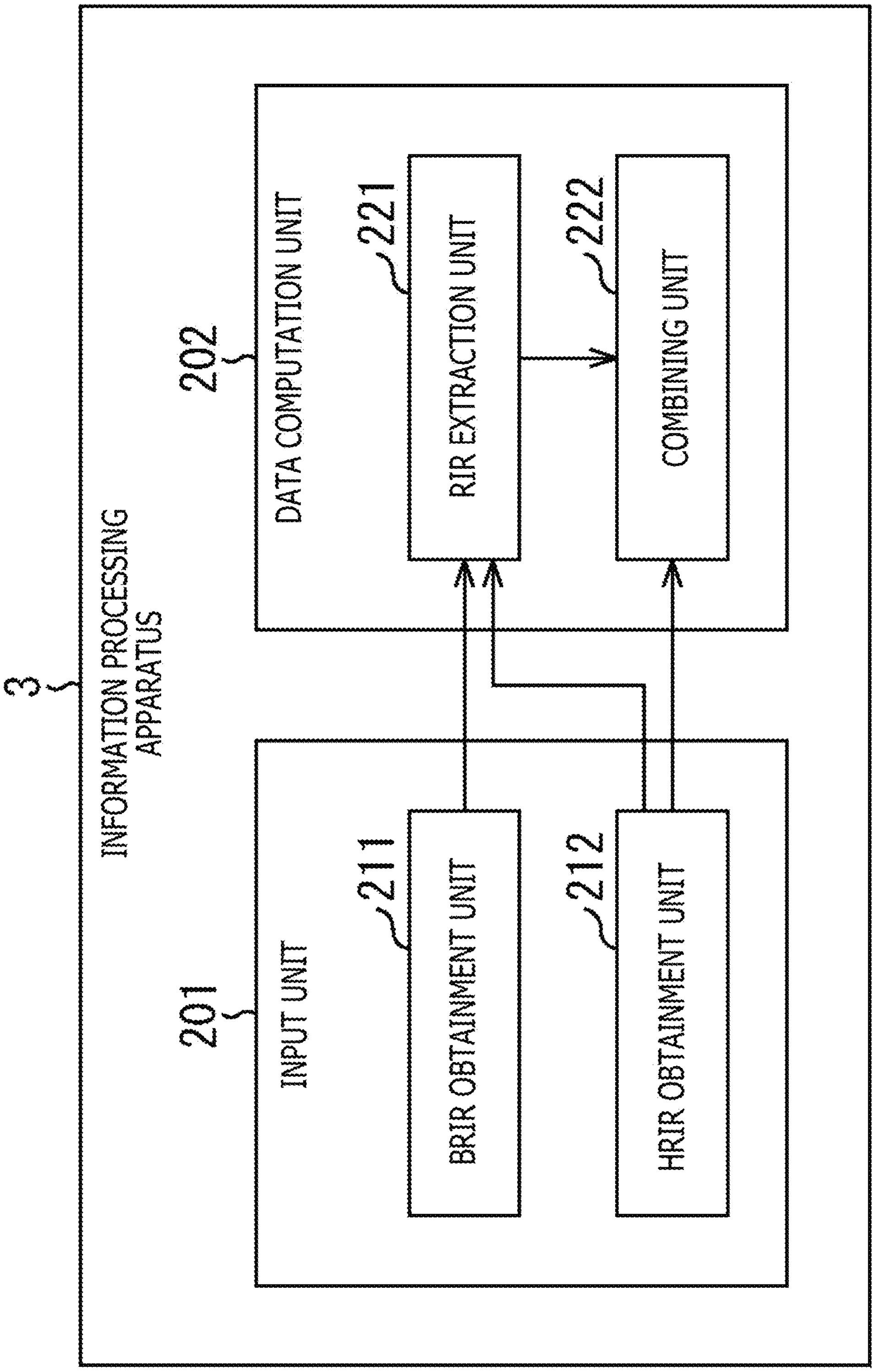
FIG. 19 is a block view that illustrates an example of a functional configuration of an information processing apparatus.

FIG. 19 is a block view that illustrates an example of a functional configuration of the information processing apparatus 3.

As illustrated in FIG. 19, the information processing apparatus 3 includes an input unit 201 and a data computation unit 202.

The input unit 201 is provided with a BRIR obtainment unit 211 and an HRIR obtainment unit 212.

The BRIR obtainment unit 211 obtains the BRIR for the no-ears HATS 21 that is stored in the storage unit 103 in the RIR measurement apparatus 1, for example, and supplies the BRIR to an RIR extraction unit 221 in the data computation unit 202.

The HRIR obtainment unit 212 obtains an HRIR for the no-ears HATS 21 and an HRIR for a user, which are stored in the storage unit 153 in the HRIR measurement apparatus 2, for example. Here, an HRIR corresponding to the direction of the speaker 11 with respect to the measurement position for the BRIR for the no-ears HATS 21 is obtained. The HRIR obtainment unit 212 supplies the HRIR for the no-ears HATS 21 to the RIR extraction unit 221, and supplies the HRIR for the user to a combining unit 222 in the data computation unit 202.

The data computation unit 202 is provided with the RIR extraction unit 221 and the combining unit 222.

From the BRIR for the no-ears HATS 21 supplied from the BRIR obtainment unit 211, the RIR extraction unit 221 cancels the ITD and the ILD which are included in the HRIR for the no-ears HATS 21 supplied from the HRIR obtainment unit 212, to thereby extract an RIR for the RIR measurement environment. The RIR extraction unit 221 supplies the RIR for the RIR measurement environment to the combining unit 222.

The combining unit 222 adjusts, according to the distance from the measurement position for the BRIR for the no-ears HATS 21 in the RIR measurement environment to the speaker 11, the gain of the HRIR that is for the user and is supplied from the HRIR obtainment unit 212. Specifically, the combining unit 222 causes the gain of the HRIR for the user to attenuate according to a distance difference between the distance from the measurement position for the BRIR for the no-ears HATS 21 to the speaker 11 and the distance from the measurement position for the HRIR for the user to the speaker 31.

The combining unit 222 combines the RIR which is for the RIR measurement environment and is supplied from the RIR extraction unit 221 with the HRIR which is for the user and for which the gain has been adjusted, to thereby generate a BRIR for the user in the RIR measurement environment.

Figure 20:
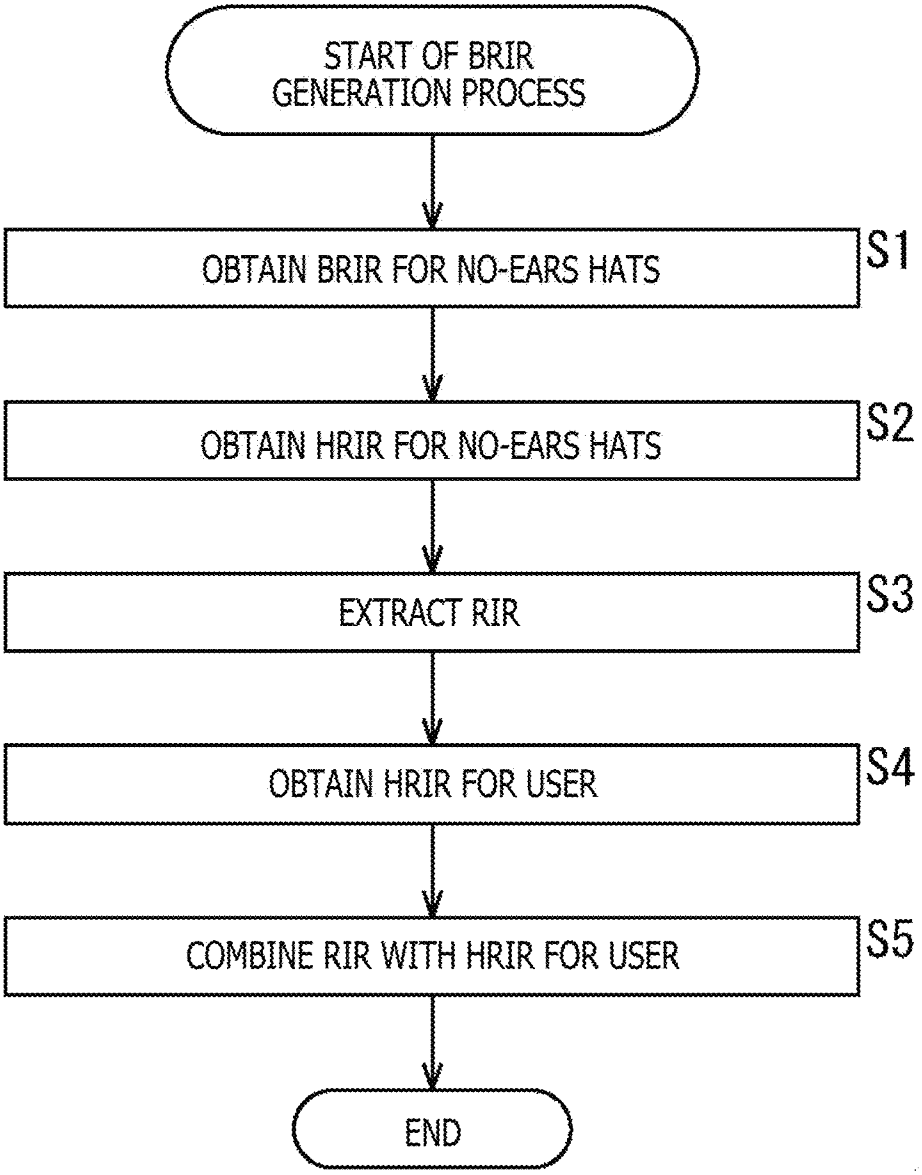
FIG. 20 is a flow chart for describing a BRIR generation process by the information processing apparatus.

Next, with reference to the flow chart in FIG. 20, description is given regarding a BRIR generation process for the information processing apparatus 3, which has such a configuration as that in FIG. 19.

In step S1, the BRIR obtainment unit 211 obtains a BRIR for the no-ears HATS 21.

In step S2, the HRIR obtainment unit 212 obtains an HRIR for the no-ears HATS 21.

In step S3, the RIR extraction unit 221 cancels the ITD and the ILD which are included in the HRIR for the no-ears HATS 21, from the BRIR for the no-ears HATS 21 to thereby extract an RIR for the RIR measurement environment.

In step S4, the HRIR obtainment unit 212 obtains an HRIR for a user. The combining unit 222 adjusts, according to the distance from the measurement position for the BRIR for the no-ears HATS 21 in the RIR measurement environment to the speaker 11, the gain of the HRIR that is for the user.

In step S5, the combining unit 222 combines the RIR which is for the RIR measurement environment with the HRIR which is for the user and for which the gain has been adjusted, and generates a BRIR for the user in the RIR measurement environment.

By virtue of the above process, the information processing apparatus 3 can accurately reproduce a BRIR which is for reproducing acoustics of an RIR measurement environment, on the basis of an RIR and an HRIR that are obtained in a state where the position of the speaker 11 with reference to a measurement position for BRIR in the RIR measurement environment matches the position of the speaker 31 with reference to a measurement position for HRIR in an HRIR measurement environment.

3. Variations

Method of Obtaining HRIR

The HRIR for a user may be, instead of actually measured data, data that is obtained by an estimation using an image in which the pinnas of the user appear, or data that is calculated according to an acoustic simulation using pinna sections modeled on the basis of a result of scanning the user's head. In addition, the HRIR for a user may be data measured using a HATS that is provided with pinna sections modeled on the basis of a result of scanning the user's head.

An HRIR that is not personalized to the user may be combined with an RIR for the RIR measurement environment. This HRIR is selected according to a recommendation that uses a database having many actual measurements, for example. The recommendation database may be, instead of actually measured data, data that is obtained using any one of an estimation using an image in which pinnas appear, an acoustic simulation, and an estimation or acoustic simulation that uses pinna sections that are randomly modeled.

Figure 21:
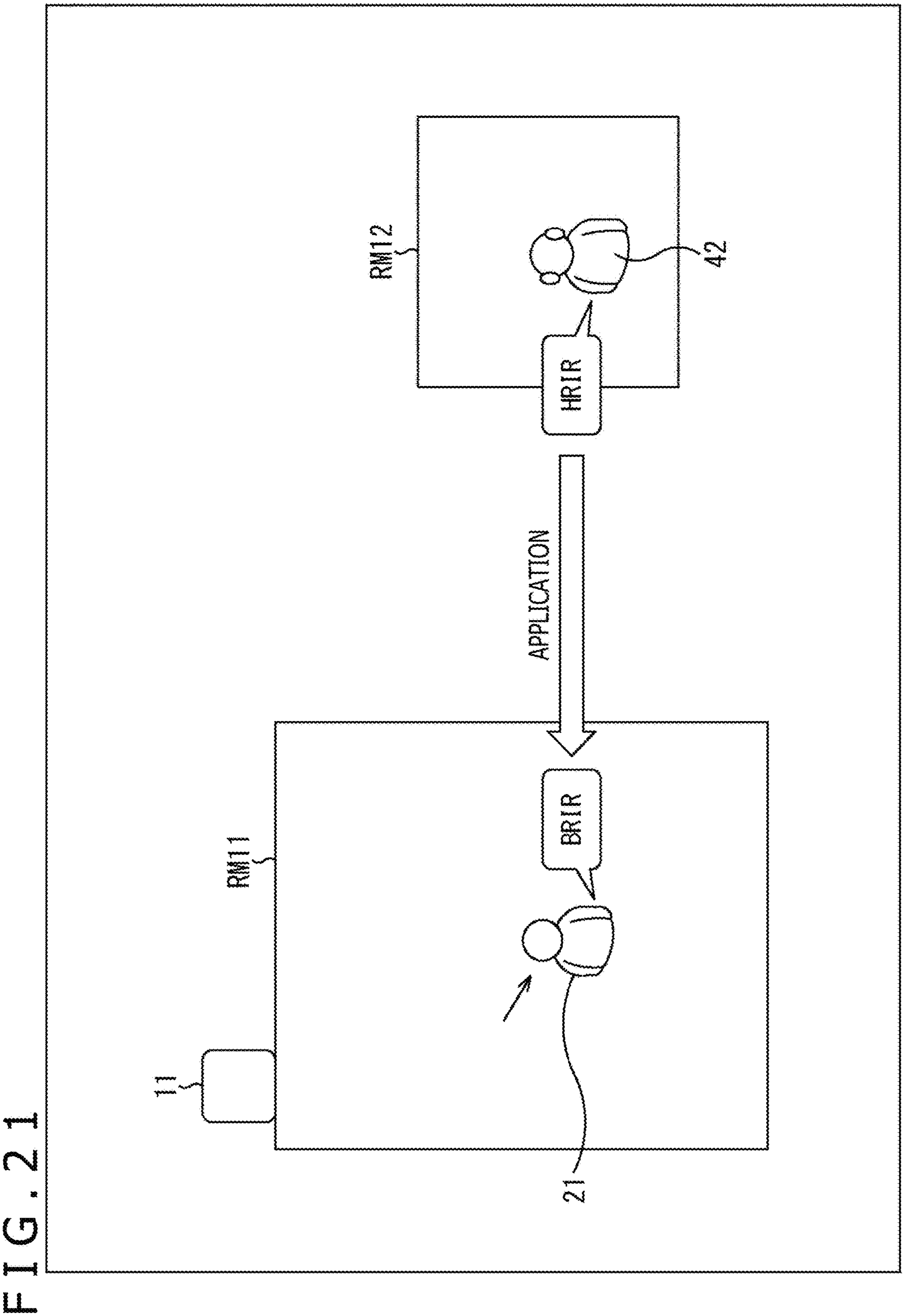
FIG. 21 is a view that illustrates another example of the BRIR generation method.

Example of Reproducing BRIR for has-Ears BRIR 42 in RIR Measurement Environment FIG. 21 is a view that illustrates another example of the BRIR generation method.

As illustrated in FIG. 21, the information processing apparatus 3 can also combine the BRIR for the no-ears HATS 21 with the HRIR for the has-ears HATS 42 to thereby reproduce a BRIR for the has-ears HATS 42 in the studio RM11.

Figure 22A:
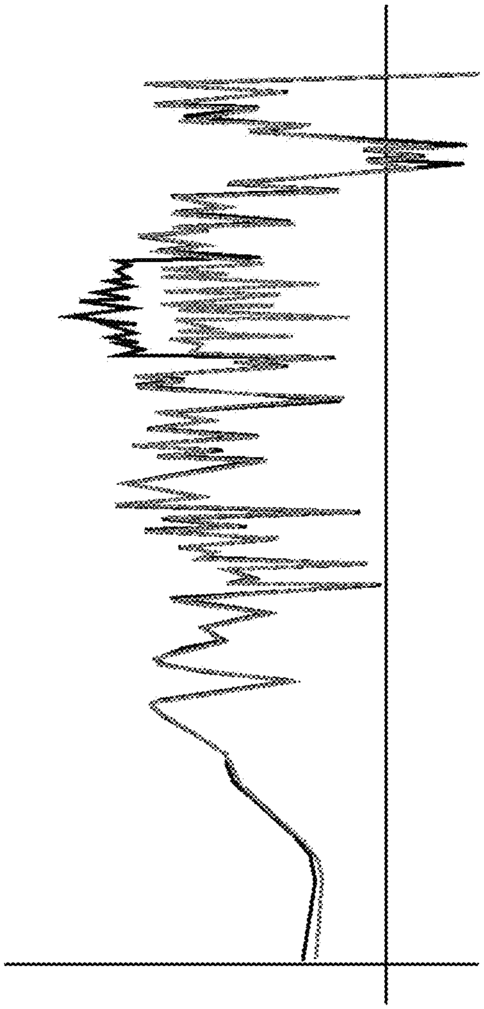
FIGS. 22A and 22B depict views that illustrate examples of comparing transfer characteristics for a no-ears HATS and a has-ears HATS that are measured in a studio.
Figure 22B:
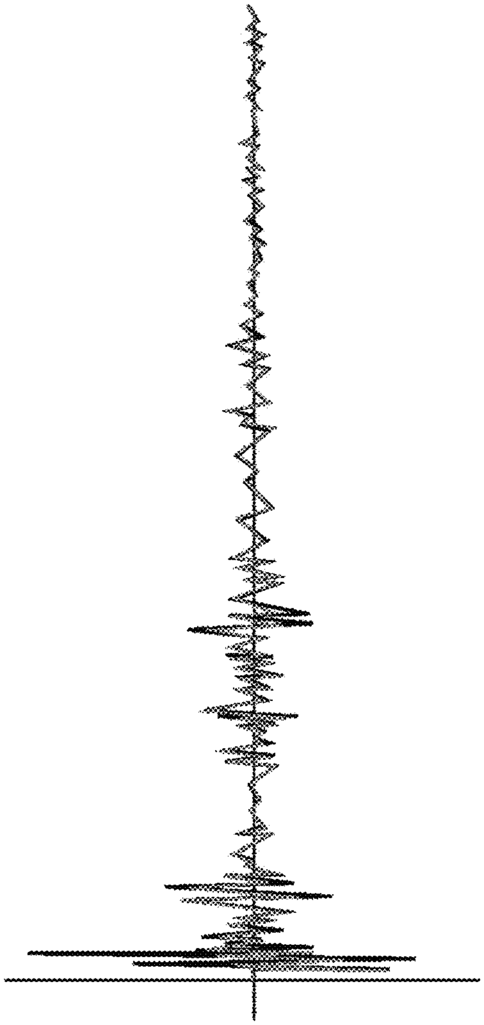

FIGS. 22A and 22B depicts views that illustrate examples of comparing transfer characteristics for the no-ears HATS 21 and the has-ears HATS 42 that are measured in the studio RM11. In FIGS. 22A and 22B, a waveform illustrated by a gray line indicates a transfer characteristic for the no-ears HATS 21, and a waveform illustrated by a black line indicates a transfer characteristic for the has-ears HATS 42.

FIG. 22A illustrates BRTFs for the no-ears HATS 21 and the has-ears HATS 42, and FIG. 22B illustrates BRIRs for the no-ears HATS 21 and the has-ears HATS 42. Upon comparing the transfer characteristic for the no-ears HATS 21 with the transfer characteristic for the has-ears HATS 42, the transfer characteristic for the no-ears HATS 21 is a waveform for which a portion of the amplitude or gain thereof is insufficient.

Figure 23A:
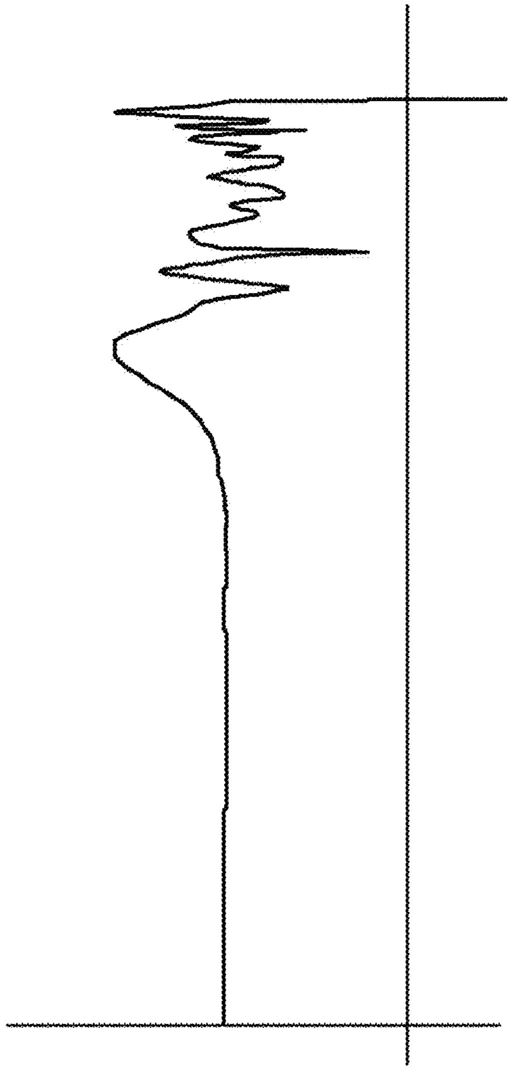
FIGS. 23A and 23B depict views that illustrate examples of transfer characteristics for a has-ears HATS measured in an anechoic room.
Figure 23B:
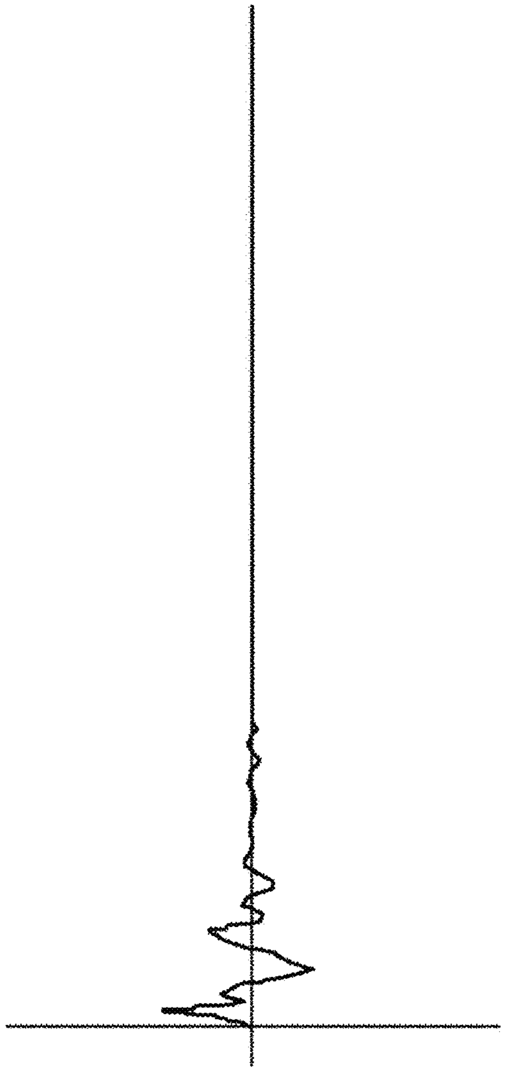

FIGS. 23A and 23B depicts views that illustrate examples of transfer characteristics for the has-ears HATS 42 measured in the anechoic room RM12.

FIG. 23A illustrates an HRTF for the has-ears HATS 42, and FIG. 23B illustrates an HRIR for the has-ears HATS 42. The transfer characteristic for the no-ears HATS 21 in the studio RM11 of FIGS. 22A and 22B is combined with the transfer characteristic for the has-ears HATS 42 in the anechoic room RM12 of FIGS. 23A and 23B, whereby a BRIR for the has-ears HATS 42 in the studio RM11 is reproduced.

Note that the transfer characteristic for the has-ears HATS 42 in the studio RM11 includes a characteristic of the speaker 11, the sound quality of the studio RM11, and the ITD and the ILD of the HATS. The transfer characteristic for the has-ears HATS 42 in the anechoic room RM12 includes the ITD and the ILD of the HATS as well as the ITD and the ILD of the HATS. Upon combining the transfer characteristics for the has-ears HATS 42 in the studio RM11 and the anechoic room RM12, the ITD and the ILD of the HATS overlap, and the ITD and the ILD of the HATS included in either transfer characteristic are canceled.

Figure 24A:
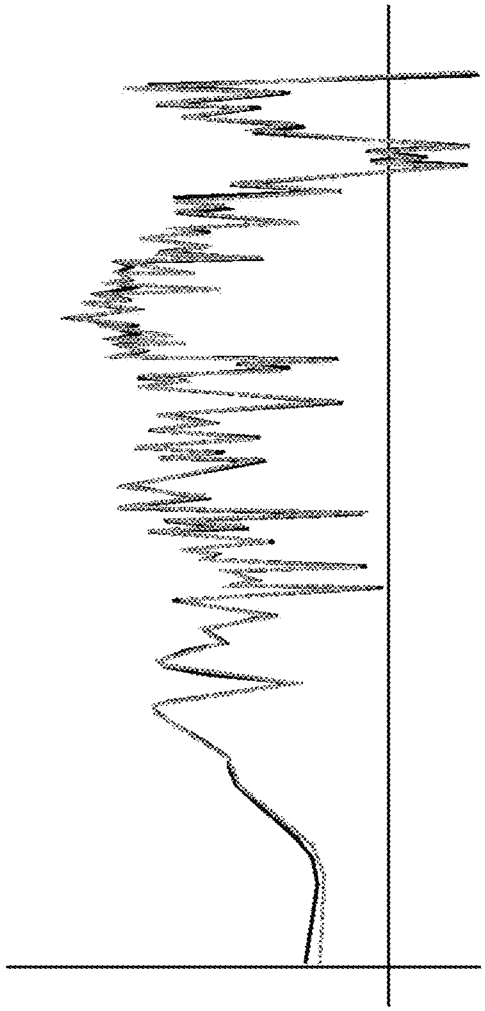
FIGS. 24A and 24B depict views that illustrate examples of comparing a transfer characteristics for a has-ears HATS measured in a studio with a reproduced transfer characteristic for a has-ears HATS.
Figure 24B:
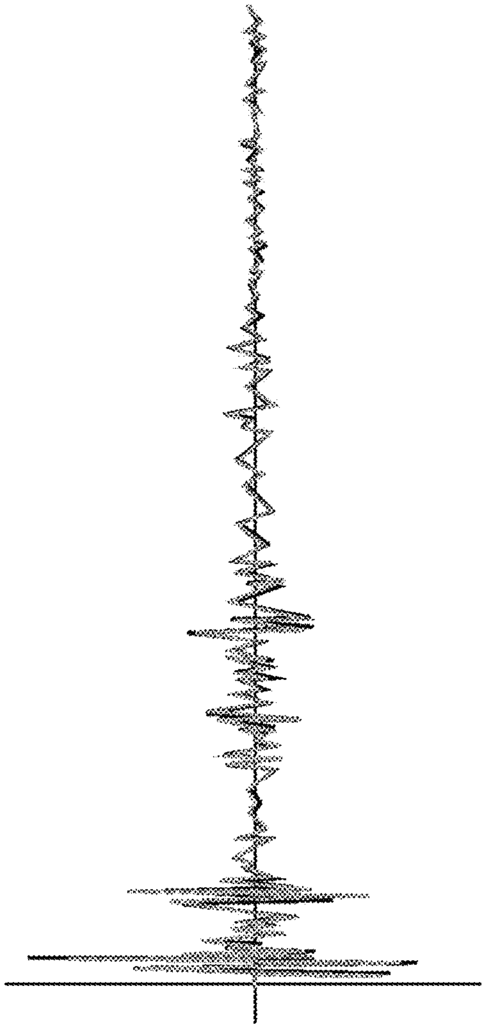

FIGS. 24A and 24B depicts views that illustrate examples of comparing a transfer characteristics for the has-ears HATS 42 measured in the studio RM11 with a reproduced transfer characteristic for the has-ears HATS 42. In FIGS. 24A and 24B, a waveform illustrated by a gray line indicates a reproduced transfer characteristic for the has-ears HATS 42, and a waveform illustrated by a black line indicates a transfer characteristic for the has-ears HATS 42 measured in the studio RM11.

FIG. 24A illustrates a BRTF for the has-ears HATS 42, and FIG. 24B illustrates a BRIR for the has-ears HATS 42. When the transfer characteristic measured in the studio RM11 is compared with the reproduced transfer characteristic, it is understood that a BRIR for the has-ears HATS 42 in the studio RM11 is accurately reproduced by combining the BRIR for the no-ears HATS 21 with the HRIR for the has-ears HATS 42.

Other

It is also possible to measure an HRIR for a user in a 9.1.6 ch speaker system, for example, and, on the basis of the measured HRIR for the user and an image in which pinnas of the user appear, estimate an HRIR corresponding to a speaker that is virtually disposed in a direction different to a direction of a speaker included in the speaker system, with reference to an HRIR measurement position.

Computer

A series of processing described above can be executed by hardware, and can be executed by software. In a case where the series of processing is executed by software, a program which makes up this software is installed from a program recording medium onto a computer incorporated in dedicated hardware, a general-purpose personal computer, etc.

Figure 25:
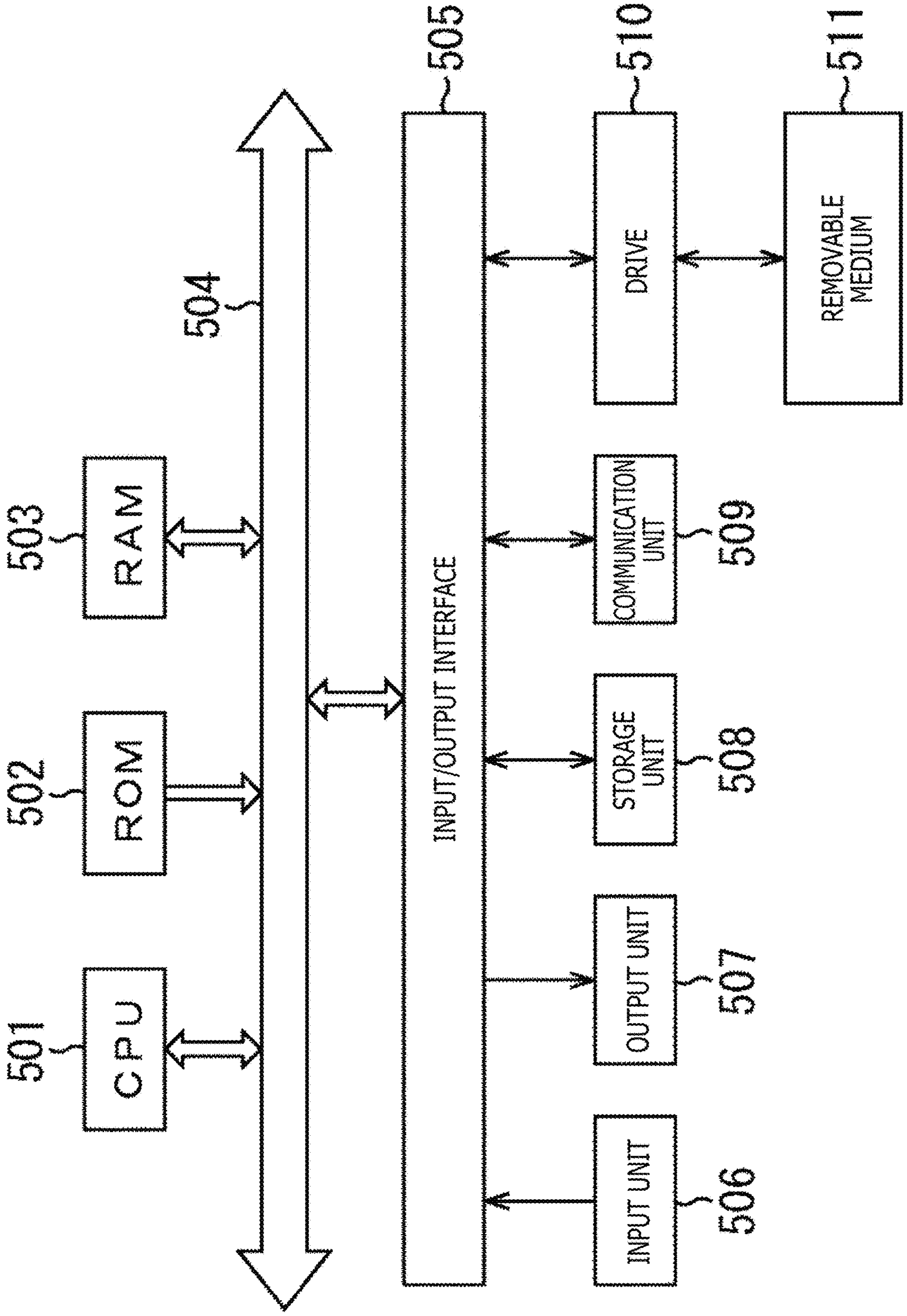
FIG. 25 is a block view that illustrates an example of a configuration of a computer.

FIG. 25 is a block view that illustrates an example of a configuration of hardware of a computer which, according to a program, executes the series of processing described above. The RIR measurement apparatus 1, the HRIR measurement apparatus 2, and the information processing apparatus 3 each include a PC that has a configuration similar to the configuration illustrated in FIG. 25, for example.

A CPU (Central Processing Unit) 501, a ROM (Read Only Memory) 502, and a RAM (Random Access Memory) 503 are mutually connected by a bus 504.

An input/output interface 505 is further connected to the bus 504. An input unit 506 including a keyboard, a mouse, or the like and an output unit 507 including a display, a speaker, or the like are connected to the input/output interface 505. In addition, a storage unit 508 including a hard disk, a non-volatile memory, or the like, a communication unit 509 including a network interface or the like, and a drive 510 for driving a removable medium 511 are connected to the input/output interface 505.

In a computer configured as above, the series of processes described above is performed by the CPU 501, for example, loading a program stored in the storage unit 508 into the RAM 503 via the input/output interface 505 and the bus 504 and executing the program.

For example, the program executed by the CPU 501 is provided by being recorded to the removable medium 511 or is provided via a wired or wireless transmission medium such as a local area network, the internet, or digital broadcasting, and is installed into the storage unit 508.

A program executed by a computer may be a program for which processes are performed in chronological order following the order described in the present specification, or may be a program for which processes are performed in parallel or at necessary timings such as when a call is performed.

Note that, in the present specification, a system means an aggregate of multiple components (apparatuses, modules (components), etc.), and it does not matter whether or not all components are within the same case. Accordingly, multiple apparatuses which are accommodated in separate cases and are connected to each other via a network and one apparatus in which multiple modules are accommodated in one case are both systems.

Note that effects described in the present specification are merely exemplary and are not limitative, and there may also be other effects.

An embodiment of the present technique is not limited to the embodiment described above, and various modifications are possible within a scope that does not deviate from the substance of the present technique.

For example, the present technique can have a cloud computing configuration in which one function is apportioned among multiple apparatuses via a network to jointly perform processes.

In addition, each step described above in the flow charts described above, in addition to being executed by one apparatus, can be executed by being apportioned among multiple apparatuses.

Further, in a case where multiple processes are included in one step, the multiple processes included in the one step, in addition to being executed by one apparatus, can be executed by being apportioned among multiple apparatuses.

Example of Configuration Combinations

The present technique can have such configurations as described below.

(1)

An information processing apparatus including: a generation unit that generates a BRIR for a first measurement position on the basis of an RIR, the RIR being obtained on the basis of a sound outputted from a first sound source disposed in a first measurement environment, and an HRIR that corresponds to a positional relation between the first sound source and a first measurement position for the RIR within the first measurement environment.

(2)

The information processing apparatus according to (1) above, in which the generation unit generates the BRIR on the basis of the HRIR that corresponds to a direction of the first sound source with respect to the first measurement position.

(3)

The information processing apparatus according to (2) above, in which the HRIR is measured on the basis of a sound outputted from a second sound source disposed in a direction that is the same as the direction of the first sound source with respect to the first measurement position, with reference to a second measurement position within a second measurement environment that is different to the first measurement environment.

(4)

The information processing apparatus according to (2) or (3) above, in which a gain for the HRIR is adjusted according to a distance from the first measurement position to a position of the first sound source.

(5)

The information processing apparatus according to any one of (1) to (4) above, further including:

an extraction unit that extracts the RIR on the basis of a first transfer characteristic measured at the first measurement position with use of a HATS that is not provided with pinna sections and a second transfer characteristic measured on the basis of a sound that is outputted from a second sound source disposed in a direction that is the same as a direction of the first sound source with respect to the first measurement position, with reference to a second measurement position within a second measurement environment different to the first measurement environment, the sound being collected by the HATS that is disposed at the second measurement position.

(6)

The information processing apparatus according to (5) above, in which the generation unit generates the RIR by canceling, from the first transfer characteristic, an ITD and an ILD that are included in the second transfer characteristic.

(7)

The information processing apparatus according to any one of (1) to (6) above, in which the HRIR is personalized to a user.

(8)

The information processing apparatus according to (7) above, in which the HRIR personalized to the user is measured on the basis of a sound collected by microphones worn on both ears of the user, in a second measurement environment different to the first measurement environment.

(9)

The information processing apparatus according to (7) above, in which the HRIR personalized to the user is obtained by any of an estimation using an image in which a pinna of the user appears, an acoustic simulation, and a measurement using a HATS that is provided with a pinna section corresponding to the pinna of the user.

(10)

The information processing apparatus according to any one of (1) to (6) above, in which the HRIR is measured on the basis of a sound collected by a HATS, in a second measurement environment different to the first measurement environment.

(11)

The information processing apparatus according to any one of (1) to (10) above, in which the HRIR is measured using a device that, according to information indicating a position of the first sound source within the first measurement environment, changes a positional relation between a second measurement position within a second measurement environment different to the first measurement environment and a second sound source used to measure the HRIR.

(12)

The information processing apparatus according to any one of (1) to (11) above, in which the RIR is obtained on the basis of a transfer characteristic measured in a state where a HATS that is disposed at the first measurement position and for which pinna sections are not provided faces multiple directions.

(13)

An information processing method including:

by an information processing apparatus, generating a BRIR for a first measurement position on the basis of an RIR, the RIR being obtained on the basis of a sound outputted from a first sound source disposed in a first measurement environment, and an HRIR that corresponds to a positional relation between the first sound source and a first measurement position for the RIR within the first measurement environment.

REFERENCE SIGNS LIST

1: RIR measurement apparatus
2: HRIR measurement apparatus
3: Information processing apparatus
11: Speaker
21: No-ears HATS
31: Speaker
42: Has-ears HATS
201: Input unit
202: Data computation unit
211: RIR obtainment unit
212: HRIR obtainment unit
221: RIR extraction unit
222: Combining unit

The invention claimed is:

1. An information processing apparatus, comprising:

a processor configured to generate a Binaural Room Impulse Response (BRIR) for a first measurement position based on a Room Impulse Response (RIR), the RIR being obtained based on a sound outputted from a first sound source disposed in a first measurement environment, and a Head-Related Impulse Response (HRIR) that corresponds to a positional relation between the first sound source and the first measurement position for the RIR within the first measurement environment.

2. The information processing apparatus according to claim 1, wherein the processor is further configured to generate the BRIR based on the HRIR that corresponds to a direction of the first sound source with respect to the first measurement position.

3. The information processing apparatus according to claim 2, wherein the HRIR is measured based on a sound outputted from a second sound source disposed in a direction that is same as the direction of the first sound source with respect to the first measurement position, with reference to a second measurement position within a second measurement environment that is different from the first measurement environment.

4. The information processing apparatus according to claim 2, wherein a gain for the HRIR is adjusted based on a distance from the first measurement position to a position of the first sound source.

5. The information processing apparatus according to claim 1, wherein the processor is further configured to extract the RIR based on a first transfer characteristic measured at the first measurement position with use of a Head and Torso Simulator (HATS) that is not provided with pinna sections, and a second transfer characteristic measured based on a sound that is outputted from a second sound source disposed in a direction that is same as a direction of the first sound source with respect to the first measurement position, and the RIR is extracted with reference to a second measurement position within a second measurement environment different from the first measurement environment, the sound being collected by the HATS that is disposed at the second measurement position.

6. The information processing apparatus according to claim 5, wherein the processor is further configured to generate the RIR by canceling, from the first transfer characteristic, an Interaural Time Difference (ITD) and an Interaural Level Difference (ILD) that are included in the second transfer characteristic.

7. The information processing apparatus according to claim 1, wherein the HRIR is personalized to a user.

8. The information processing apparatus according to claim 7, wherein the HRIR personalized to the user is measured based on a sound collected by microphones worn on both ears of the user, in a second measurement environment different from the first measurement environment.

9. The information processing apparatus according to claim 7, wherein the HRIR personalized to the user is obtained by any of an estimation using an image in which a pinna of the user appears, an acoustic simulation, and a measurement using a Head and Torso Simulator (HATS) that is provided with a pinna section corresponding to the pinna of the user.

10. The information processing apparatus according to claim 1, wherein the HRIR is measured based on a sound collected by a Head and Torso Simulator (HATS), in a second measurement environment different from the first measurement environment.

11. The information processing apparatus according to claim 1, wherein the HRIR is measured using a device that, based on information indicating a position of the first sound source within the first measurement environment, changes a positional relation between a second measurement position within a second measurement environment different from the first measurement environment and a second sound source used to measure the HRIR.

12. The information processing apparatus according to claim 1, wherein the RIR is obtained based on a transfer characteristic measured in a state where a Head and Torso Simulator (HATS) that is disposed at the first measurement position and for which pinna sections are not provided faces multiple directions.

13. An information processing method, comprising:

by an information processing apparatus, generating a Binaural Room Impulse Response (BRIR) for a first measurement position based on a Room Impulse Response (RIR), the RIR being obtained based on a sound outputted from a first sound source disposed in a first measurement environment, and a Head-Related Impulse Response (HRIR) that corresponds to a positional relation between the first sound source and the first measurement position for the RIR within the first measurement environment.

* * * * *